United States Patent
Liu et al.

(10) Patent No.: US 10,911,177 B2
(45) Date of Patent: Feb. 2, 2021

(54) CHANNEL STATE INFORMATION MEASUREMENT AND FEEDBACK FOR TRANSMISSION MODE SWITCHING

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/352,688

(22) Filed: Mar. 13, 2019

(65) Prior Publication Data

US 2019/0386769 A1 Dec. 19, 2019

Related U.S. Application Data

(60) Provisional application No. 62/684,675, filed on Jun. 13, 2018, provisional application No. 62/684,684, filed on Jun. 13, 2018.

(51) Int. Cl.
*H04L 1/00* (2006.01)
*H04B 7/0456* (2017.01)
(Continued)

(52) U.S. Cl.
CPC ............ *H04L 1/003* (2013.01); *H04B 7/0456* (2013.01); *H04B 7/0626* (2013.01);
(Continued)

(58) Field of Classification Search
CPC ..... H04L 1/003; H04L 1/0003; H04L 1/0025; H04L 1/0687; H04L 1/0693;
(Continued)

(56) References Cited

U.S. PATENT DOCUMENTS

2010/0323709 A1* 12/2010 Nam ..................... H04L 5/0023
455/450
2011/0116437 A1 5/2011 Chen et al.
(Continued)

FOREIGN PATENT DOCUMENTS

WO WO-2011097876 A1 * 8/2011 ............ H04W 99/00
WO 2011123975 A1 10/2011
(Continued)

OTHER PUBLICATIONS

Huawei: "Summary of Email Approval [90b-LTE-13] on Remaining Details of sPDSCH/sPUSCH Design", 3GPP TSG RAN WG1 Meeting #91, 3GPP Draft; R1-1719957, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 27, 2017-Dec. 1, 2017, Nov. 17, 2017 (Nov. 17, 2017), 45 Pages, XP051369209, Retrieved from the Internet: URL: https://www.3gpp.org/ftp/tsg_ran/WG1_RL1/TSGR1_91/Docs/ [retrieved on Nov. 17, 2017].
(Continued)

*Primary Examiner* — Warner Wong
(74) *Attorney, Agent, or Firm* — Arent Fox, LLP; Nerrie M. Zohn

(57) ABSTRACT

A method, apparatus, and computer-readable medium are presented that enables dynamic switching of transmission modes by a UE. A UE may be configured with a transmission mode. However, the configured transmission mode might not meet the needs of changing network conditions. Aspects presented herein enable a base station to assist a UE in switching between transmission modes. The base station may signal a combination of transmission modes to the UE, e.g., including at least a first transmission mode and a second transmission mode. The UE may then monitor for one or more DCI formats in order to determine whether to switch
(Continued)

among transmission modes from the indicated combination of transmission modes

30 Claims, 18 Drawing Sheets

(51) Int. Cl.
*H04L 5/00* (2006.01)
*H04W 72/04* (2009.01)
*H04B 7/06* (2006.01)
*H04W 88/06* (2009.01)

(52) U.S. Cl.
CPC .......... *H04L 1/0026* (2013.01); *H04L 1/0027* (2013.01); *H04L 5/0053* (2013.01); *H04W 72/042* (2013.01); *H04L 1/0025* (2013.01); *H04W 88/06* (2013.01)

(58) Field of Classification Search
CPC ..... H04L 5/0053; H04L 47/58; H04B 7/0456; H04B 7/0626; H04W 72/042; H04W 52/0258; H04W 88/06
See application file for complete search history.

(56) References Cited

U.S. PATENT DOCUMENTS

| | | | |
|---|---|---|---|
| 2012/0195267 A1* | 8/2012 | Dai | H04B 7/06 370/329 |
| 2013/0114532 A1* | 5/2013 | Choi | H04L 5/0091 370/329 |
| 2013/0148623 A1* | 6/2013 | Nishio | H04L 5/0053 370/329 |
| 2013/0188577 A1* | 7/2013 | Papasakellariou | H04L 5/0023 370/329 |
| 2013/0223378 A1* | 8/2013 | Gao | H04W 72/042 370/329 |
| 2013/0250879 A1* | 9/2013 | Ng | H04W 72/042 370/329 |
| 2014/0119269 A1* | 5/2014 | Guan | H04L 1/0006 370/312 |
| 2014/0211695 A1 | 7/2014 | Cui et al. | |
| 2015/0055485 A1 | 2/2015 | Kim et al. | |
| 2015/0270917 A1 | 9/2015 | Roman et al. | |
| 2015/0312927 A1* | 10/2015 | Ko | H04W 72/1273 370/336 |
| 2015/0319777 A1* | 11/2015 | Seo | H04L 1/1822 370/330 |
| 2017/0141903 A1 | 5/2017 | Xu et al. | |
| 2018/0191414 A1 | 7/2018 | Suzuki et al. | |
| 2018/0249300 A1 | 8/2018 | Han et al. | |
| 2019/0037563 A1 | 1/2019 | Lyu et al. | |
| 2019/0150103 A1* | 5/2019 | Papasakellariou | H04W 74/0833 |
| 2019/0166588 A1* | 5/2019 | Abdel Shahid | H04W 72/042 |
| 2019/0190630 A1 | 6/2019 | Deng et al. | |
| 2019/0245646 A1* | 8/2019 | Robert Safavi | H04L 1/0047 |
| 2019/0334601 A1 | 10/2019 | Han et al. | |
| 2019/0349046 A1 | 11/2019 | Liu et al. | |
| 2019/0372641 A1 | 12/2019 | Muruganathan et al. | |
| 2019/0386771 A1 | 12/2019 | Liu et al. | |
| 2020/0107353 A1* | 4/2020 | Jung | H04W 72/042 |
| 2020/0295878 A1* | 9/2020 | Choi | H04L 1/18 |

FOREIGN PATENT DOCUMENTS

| | | | | |
|---|---|---|---|---|
| WO | WO-2014019436 A1 * | 2/2014 | ........ | H04W 74/0833 |
| WO | 2014131353 A1 | 9/2014 | | |
| WO | WO-2015013977 A1 * | 2/2015 | ............ | H04W 72/04 |
| WO | WO-2018212557 A1 * | 11/2018 | ............ | H04W 72/04 |
| WO | WO-2019213928 A1 * | 11/2019 | ............ | H04W 72/04 |

OTHER PUBLICATIONS

CMCC Huawei: "PDCCH Design of Carrier Aggregation", 3GPP TSG RAN WG1 Meeting #57, 3GPP Draft; R1-091829 PDCCH Design of Carrier Aggregation, 3rd Generation Partnership Project (3GPP), Mobile Competence Centre; 650, Route Des Lucioles; F-06921 Sophia-Antipolis Cedex; France, No. San Francisco, USA; Apr. 28, 2009, Apr. 28, 2009 (Apr. 28, 2009), 3 Pages, XP050339333, [retrieved on Apr. 28, 2009] figures 1-3.
Convida Wireless: "Discussion on DL MIMO Transmission in NR", 3GPP TSG RAN WG1 Meeting #87, 3GPP Draft; R1-1613012_DL_MIMO_Transmission, 3rd Generation-Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), 3 Pages, XP051176939, Retrieved from the Internet: URL: http://www.3gpp.org/ftp/Meetings_3GPP_SYNC/RAN1/Docs/ [retrieved on Nov. 13, 2016] Section 2.2; page second.
Huawei, et al., "Discussion on DL MIMO Transmission", 3GPP TSG RAN WG1 Meeting #86bis, 3GPP Draft; R1-1608819, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 10, 2016-Oct. 14, 2016, Oct. 9, 2016, 4 Pages, XP051148873, Retrieved from the Internet: URL: http://www.3gpp.org/ftp/Meetings_3GPP_SYNC/RAN1/Docs/ [retrieved on Oct. 9, 2016] Section 3.1; Page second Section 4; Page third; figure 2.
International Search Report and Written Opinion—PCT/US2019/036514—ISA/EPO—dated Sep. 9, 2019.

* cited by examiner

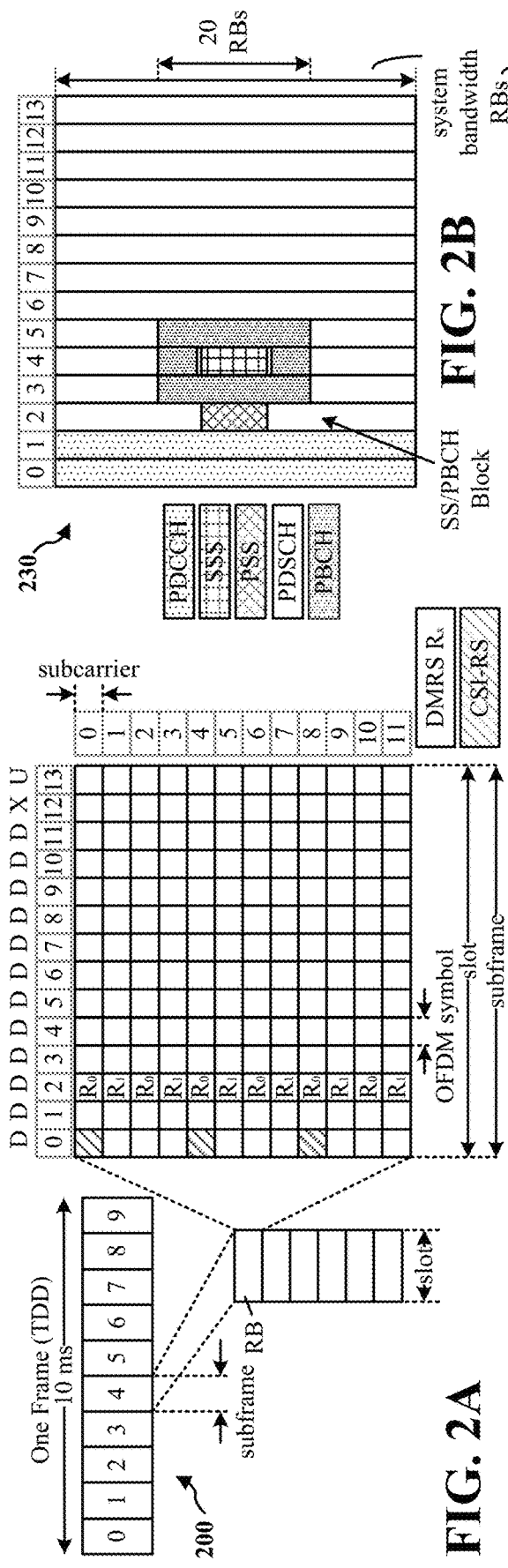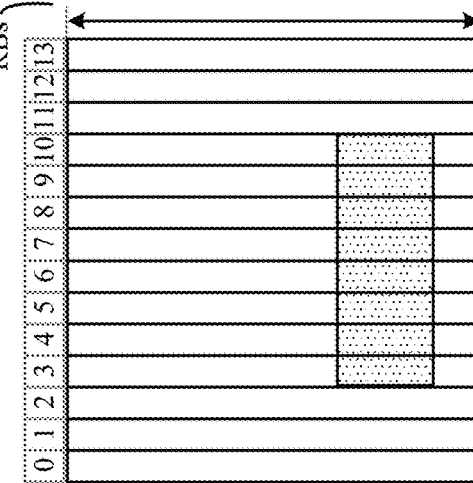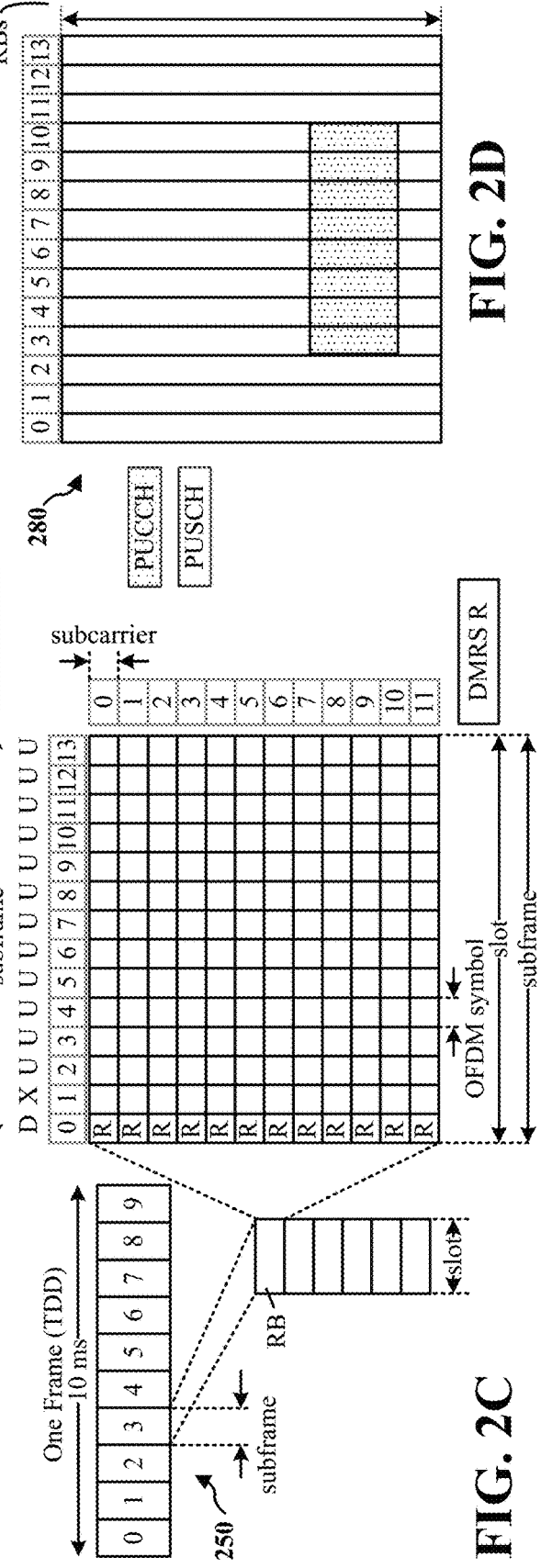

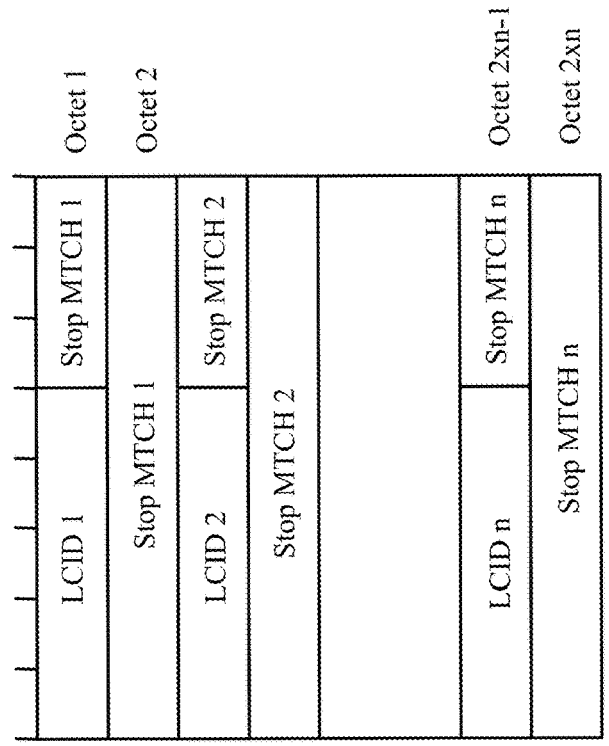
FIG. 4C
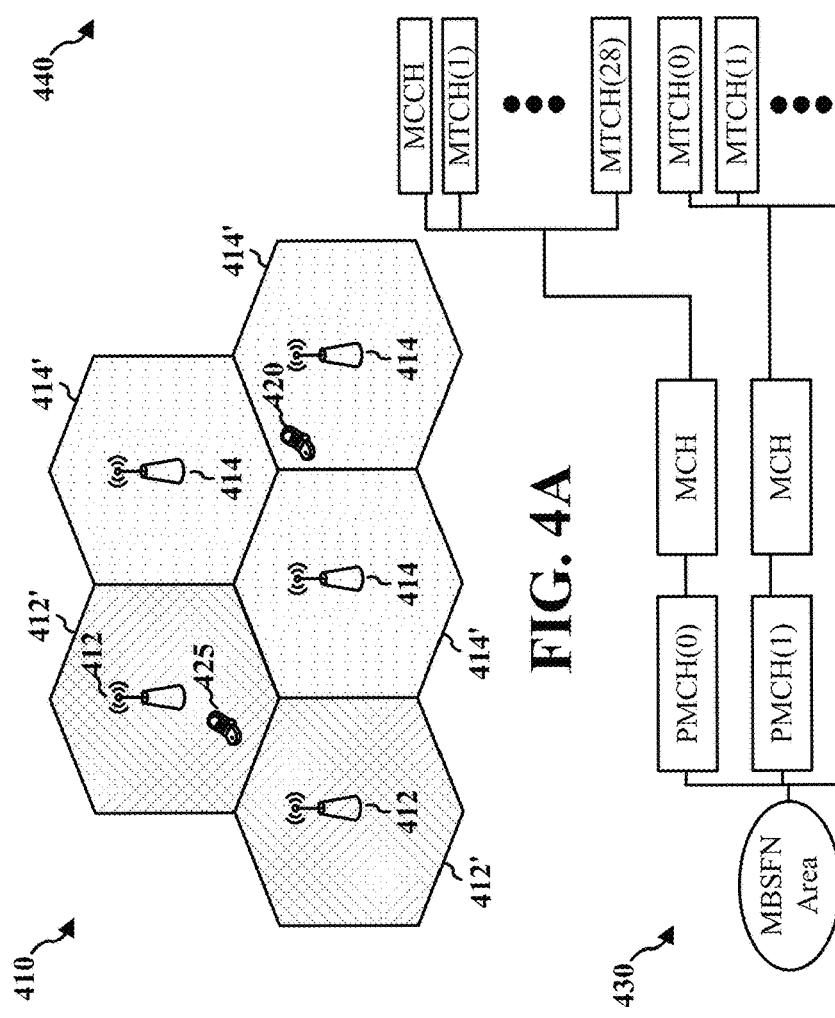
FIG. 4A
FIG. 4B
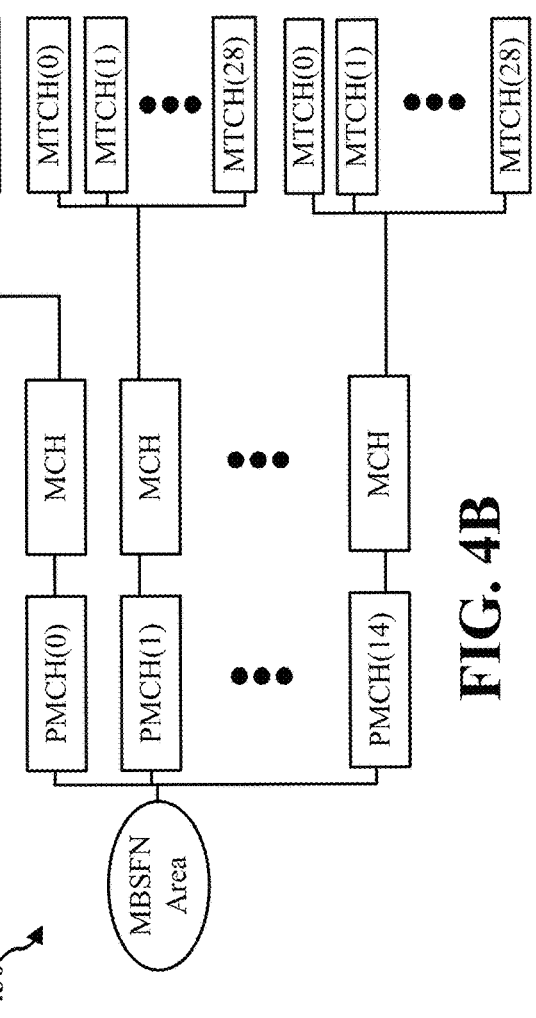

CHANNEL STATE INFORMATION MEASUREMENT AND FEEDBACK FOR TRANSMISSION MODE SWITCHING

CROSS REFERENCE TO RELATED APPLICATIONS

This application claims the benefit of U.S. Provisional Application Ser. No. 62/684,675, entitled "CHANNEL STATE INFORMATION MEASUREMENT AND FEEDBACK FOR TRANSMISSION MODE SWITCHING" and filed on Jun. 13, 2018, and claims the benefit of U.S. Provisional Application Ser. No. 62/684,684, entitled "TRANSMISSION MODE SWITCHING" and filed on Jun. 13, 2018, which are expressly incorporated by reference herein in their entirety.

BACKGROUND

Technical Field

The present disclosure relates generally to communication systems, and more particularly, to wireless communication involving transmission mode (TM) switching.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A base station may configure a user equipment (UE) with a particular TM to help the UE determine how to process downlink transmissions received on the Physical Downlink Shared Channel (PDSCH). The TM designated for the UE may be indicated in radio resource control (RRC) signaling whenever the UE establishes an RRC connection (e.g., initial connection to an LTE network, a reestablishment of an RRC connection after some kind of radio link failure or other radio connection failure, or after handover to a different radio access network (RAN), etc.).

The TM configured for a UE may be determined based on one or more of the capability of the UE, the capability of the serving base station, downlink channel conditions, the number of UEs for which downlink transmissions can be spatially combined (e.g., single-user (SU) multiple-input and multiple-output (MIMO) (SU-MIMO), multiple-user (MU) MIMO (MU-MIMO), multi-point/multi-layer coordinated multi-point (CoMP)), and/or the number of spatial layers.

Problems may arise for a UE using a particular transmission mode if network conditions change while the UE is connected to the network. Aspects presented herein provide mechanism way for a base station to trigger dynamic switching of TMs, e.g., without requiring the UE to establish a new RRC connection.

Aspects of the present disclosure provide a solution by enabling a base station to configure a UE with a combination of TMs (e.g., TM 3+TM 8, TM 3+TM 9, TM 4+TM 8, TM 4+TM9, TM3+TM4+TM8, TM3+TM4+TM9, etc.) via RRC signaling. In certain implementations, different DCI formats with the same size may be used to indicate different TMs to limit the complexity of the blind detection performed by the UE. In certain other implementations, different sized DCI formats may be used to indicate different TMs, but with a reduced number of possible PDCCH candidates and/or aggregation levels to limit the complexity of blind detection performed by the UE.

However, CSI feedback may become burdensome and require an undesirable amount of overhead for combinations of transmission modes. Accordingly, aspects presented herein further enable dynamic and corresponding CSI feedback that limits the burden on the UE and that improves efficient use of overhead.

In a first aspect of the disclosure, a method, a computer-readable medium, and an apparatus are provided. In certain configurations, the apparatus may be a UE. The apparatus may receive signaling from a base station for a combination of transmission modes comprising at least a first transmission mode and a second transmission mode. The apparatus may monitor one or more DCI formats based on the combination of transmission modes.

In certain other configurations, the apparatus may be a base station. The apparatus may transmit signaling to a UE for a combination of transmission modes comprising at least a first transmission mode and a second transmission mode. The apparatus may transmit one or more DCI formats based on the combination of transmission modes.

In a second aspect of the disclosure, a method, a computer-readable medium, and an apparatus are provided for wireless communication at a User Equipment (UE). The apparatus receives signaling from a base station for a combination of transmission modes comprising at least a first transmission mode and a second transmission mode.

The apparatus then measures at least one reference signal for CSI feedback based on the combination of transmission modes.

In certain other configurations, a method, a computer-readable medium, and an apparatus are provided for wireless communication at a base station. The apparatus signals a combination of transmission modes to a UE, the combination of transmission modes comprising at least a first transmission mode and a second transmission mode. The apparatus then receives CSI feedback for the combination of transmission modes based on at least one reference signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 4A is a diagram illustrating an example of Multicast Broadcast Single Frequency Network areas in an access network.

FIG. 4B is a diagram illustrating an example of an evolved Multimedia Broadcast Multicast Service channel configuration in a Multicast Broadcast Single Frequency Network.

FIG. 4C is a diagram illustrating a format of a Multicast Channel (MCH) Scheduling Information (MSI) Medium Access Control element.

DETAILED DESCRIPTION

Figure 1:
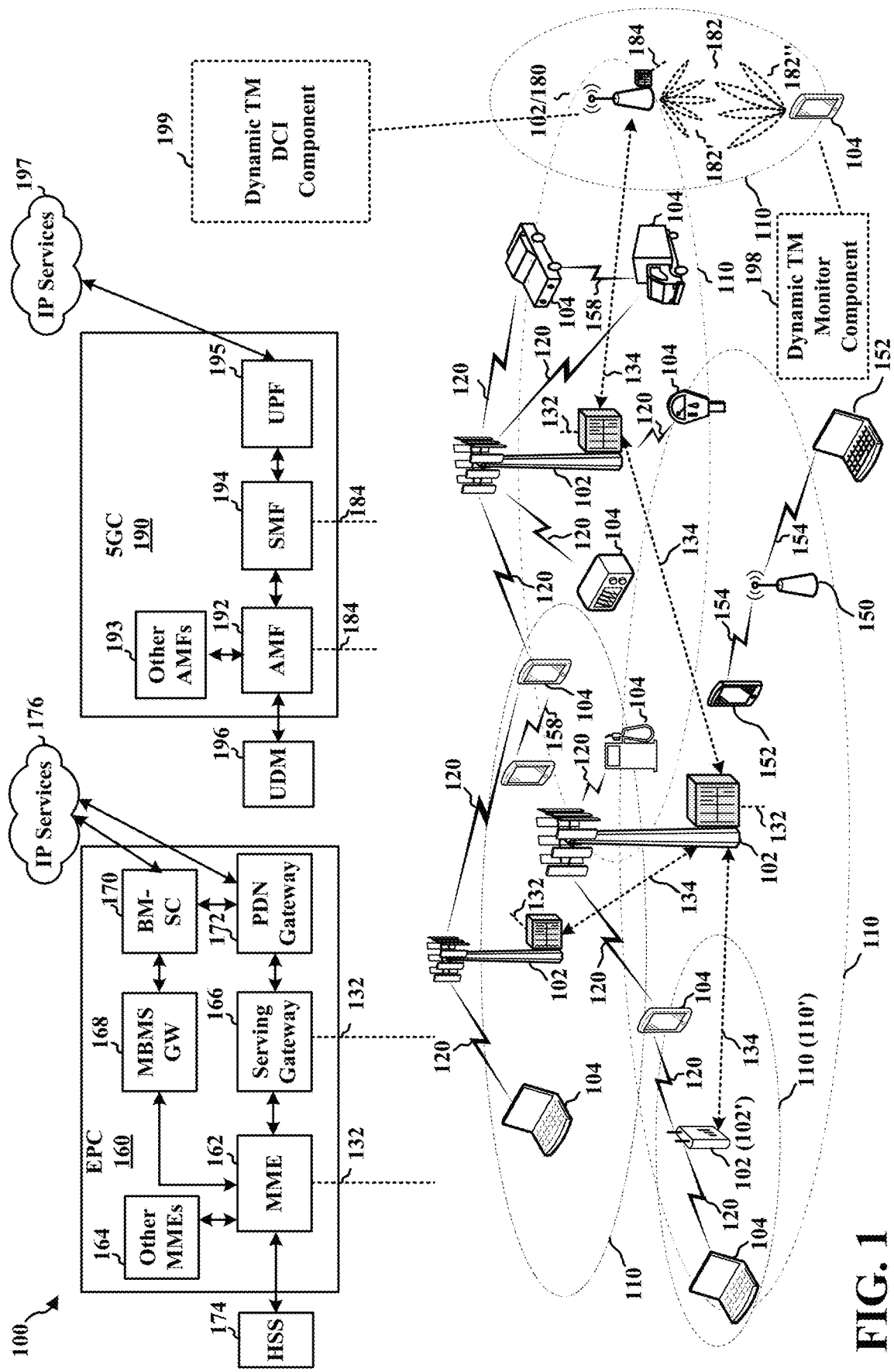
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 includes a dynamic TM measure component 198 which may be configured to receive signaling from base station 102 for a combination of transmission modes and measure at least one RS for CSI feedback based on the combination of transmission modes, e.g., as described below in connection with any of FIGS. 6, 13-18. In other aspects, the base station 102, 180 may include a dynamic TM CSI component 199 which may be configured to signal a combination of transmission modes to UE 104 and receive CSI feedback for the combination of transmission modes based on at least one reference signal, e.g., as described below in connection with any of FIGS. 6, 13-18. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^{\mu}*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
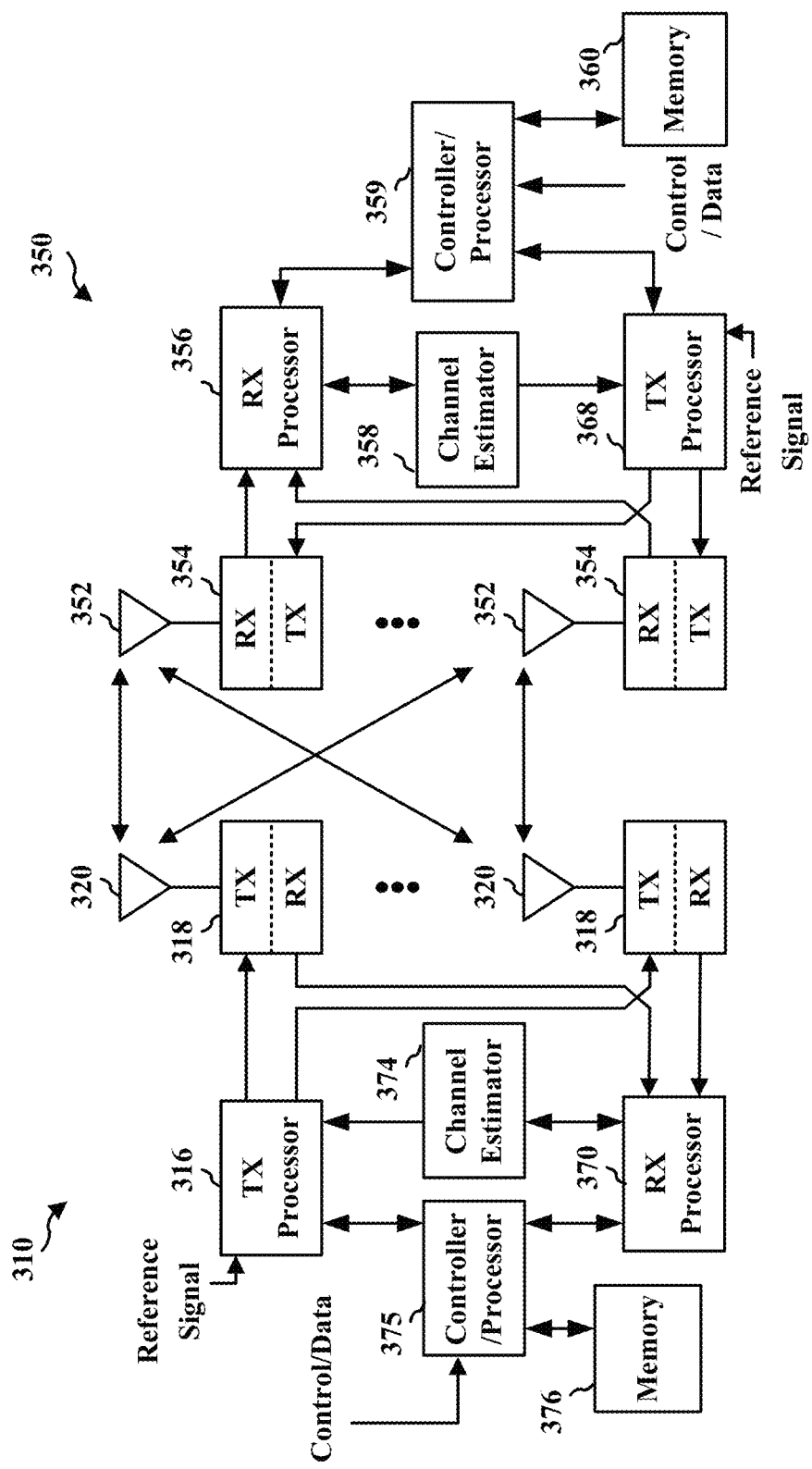
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198. At least one of the TX processor 316, the RX processor 370, and the controller/processor 375 may be configured to perform aspects in connection with 199.

FIG. 4A is a diagram 410 illustrating an example of MBSFN areas in an access network. The base stations 412 in cells 412' may form a first MBSFN area and the base stations 414 in cells 414' may form a second MBSFN area. The base stations 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each base station in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCID) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCID.

A base station may configure a UE with a particular TM that may be used to process downlink transmissions received on a PDSCH. The TM designated for the UE may be indicated using RRC signaling each time the UE establishes an RRC connection (e.g., initial connection to an LTE network, a reestablishment of an RRC connection after a radio link failure or other radio connection failure, or after handover to a different radio access network (RAN), etc.).

The base station may select a TM for a UE based on one or more of the capability of the UE, the capability of the serving base station, downlink channel conditions, the number of UEs for which downlink transmissions can be spatially combined (e.g., single-user (SU) multiple-input and multiple-output (MIMO) (SU-MIMO), multiple-user (MU) MIMO (MU-MIMO), multi-point/multi-layer coordinated multi-point (CoMP)), and/or the number of spatial layers available for downlink transmissions.

When a single UE is available for codebook-based MIMO with a single or multiple spatial layers, the base station may indicate either transmission mode 3 (TM3) (e.g., open-loop codebook-based SU-MIMO) or transmission mode 4 (TM4) (e.g., closed-loop codebook-based SU-MIMO). When a single UE or multiple UEs can be spatially combined in non-codebook-based MIMO with a single or multiple spatial layers, the base station may indicate either transmission mode 8 (TM8) (e.g., non-codebook-based SU/MU-MIMO with a maximum of 2 spatial layers) or transmission mode 9 (TM9) (e.g., non-codebook based SU/MU-MIMO with a maximum of 8 spatial layers). When multi-point/multi-layer (CoMP) is available for a UE, the base station may indicate transmission mode 10 (TM10). Based on the configured TM, the UE may perform blind decoding of the PDCCH to monitor for a specific downlink control information (DCI) format associated with the configured TM. A comparison of TMs, demodulation signals, CSI feedback, and DCI formats within a user-specific search space (USS), e.g., for LTE, is listed below in Table 1.

TABLE 1

Comparison of TM3/4/8/9/10

| TM for SU/<br>MU-MIMO | Demodu-<br>lation | CSI<br>feedback | DCI format within<br>USS |
|---|---|---|---|
| TM3: OL-SU-MIMO | CRS | — | DCI format 2A |
| TM4: CL-SU-MIMO | CRS | CRS | DCI format 2 |
| TM8: Dual layer<br>SU/MU-MIMO | DMRS | CRS SRS<br>for TDD | DCI format 2B |
| TM9: Multi-layer<br>SU/MU-MIMO | DMRS | CSI-R SRS<br>for TDD | DCI format 2C |
| TM10: Multi-<br>layer/Multi-<br>point CoMP | DMRS | CSI process<br>SRS for TDD | DCI format 2D |

A base station may be limited from dynamically switching a configured TM while the UE is connected to the network. Even when network conditions change, there may not be a mechanism to trigger dynamic switching of TMs until the UE establishes a new RRC connection. For example, when a UE is initially configured with TM 3 (e.g., SU-MIMO), and the base station determines that multiple UEs may be spatially combined on the downlink, the base station be unable to dynamically switch a UE from TM 3 to TM8 in order to increase downlink throughput. The inability to switch TM may reduce effective communication between the base station and the UE.

In a first aspect, the present disclosure provides a solution for this problem by enabling a base station to configure a UE with a combination of TMs (e.g., TM 3+TM 8, TM 3+TM 9, TM 4+TM 8, TM 4+TM9, TM3+TM4+TM8, TM3+TM4+TM9, etc.) via RRC signaling, e.g., as described below in connection with any of FIGS. 5 and 7-12. The base station may configure a UE to switch on (e.g., apply) a TM with a longer period as a primary TM by RRC signaling and to switch on another TM with a shorter period as a secondary TM by RRC signaling. Alternatively, the base station may configure the UE to switch on/off more than one TM at the same time by RRC signaling. In certain implementations, different DCI formats with the same size may be used to indicate different TMs to limit the complexity of the blind detection performed by the UE. In certain other implementations, different sized DCI formats may be used to indicate different TMs, but with a reduced number of possible PDCCH candidates and/or aggregation levels to limit the complexity of blind detection performed by the UE.

Figure 5:
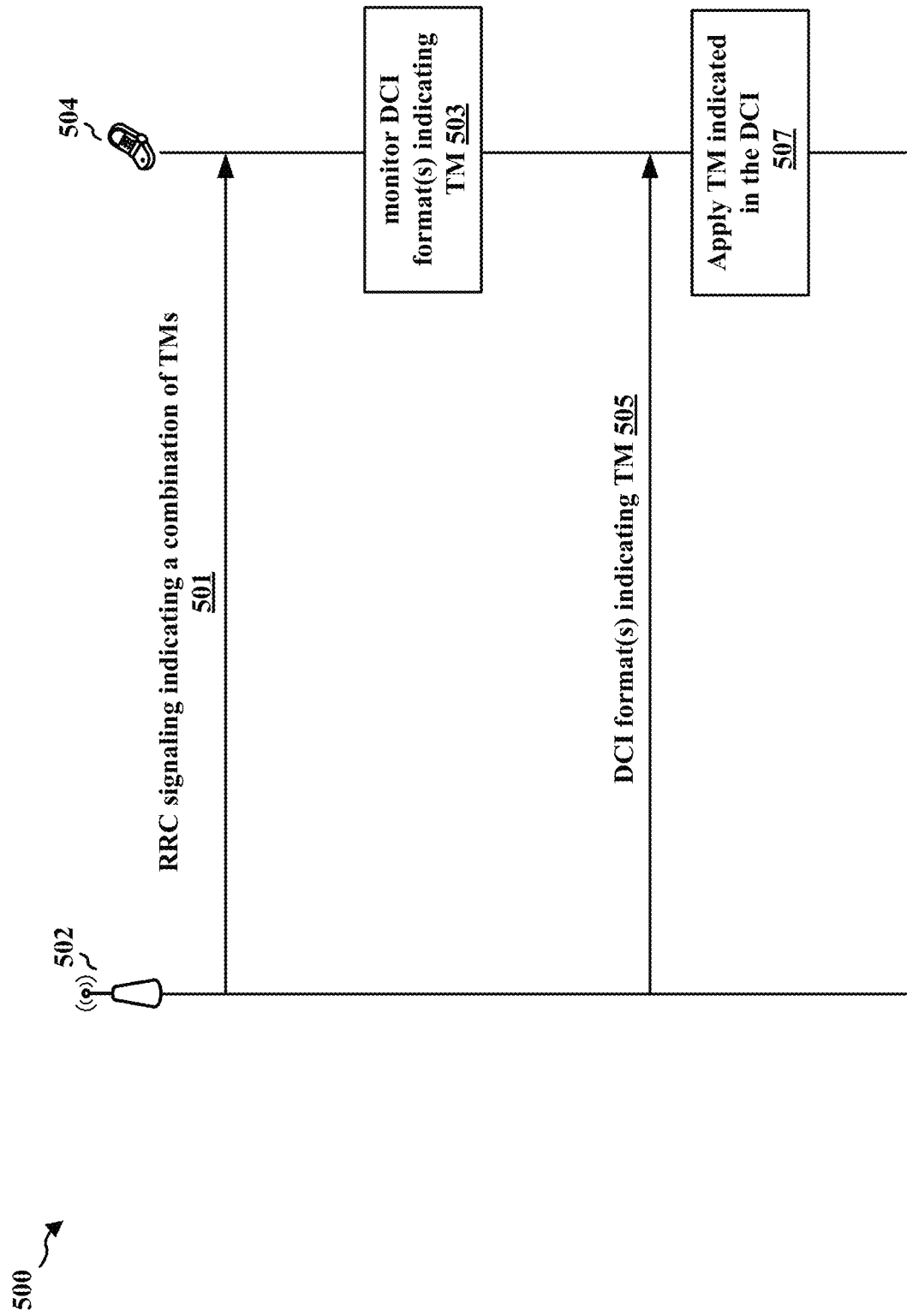
FIG. 5 is a call flow 500 that may be used to enable dynamic TM switching in accordance with aspects of the disclosure.

FIG. 5 is a call flow 500 which may be performed between a base station 502 and a UE 504 to enable dynamic TM switching in accordance with certain aspects of the disclosure. The base station 502 may correspond to, e.g., the base station 102, 604, 850, eNB 310, the apparatus 1102/1102'. The UE 504 may correspond to, e.g., the UE 104, 350, 602, 1150, the apparatus 802/802'.

Referring to FIG. 5, the base station 502 may transmit (at 501) RRC signaling that indicates a combination of TMs that may be used for downlink communications during the RRC connection. For example, the RRC signaling may indicate a combination that includes TM 3+TM 8, TM 3+TM 9, TM 4+TM 8, TM 4+TM9, TM3+TM4+TM8, TM3+TM4+TM9, just to name a few. This list of combinations is merely an example, to illustrate the concept of signaling TM combination(s) to the UE. Although, a single RRC signal 501 is illustrated as indicating the combination of TMs, more than one RRC signal, RRC object, and/or variable type of RRC message may be used to indicated the combination of TMs. In certain aspects, the RRC signaling may include multiple RRC signals. For example, a first RRC signal may be sent that indicates the first TM of the combination, and a second RRC signal may be sent that indicates the second TM of the combination. Alternatively, an RRC message may include a first field (e.g., a legacy field) that indicates the first TM of the combination, and the RRC message may also include a new field to indicate the second TM of the combination.

Each of the TMs may have one or more of a DCI format, a DCI format size, a number of PDCCH candidates, and/or a number of aggregated CCEs associated therewith. The UE 504 may monitor (at 503) one or more DCI formats for the combination of TMs indicated in the RRC signaling.

In a first example, the UE 504 may monitor (at 503) for one or more DCI formats with the same size for each of the TMs in the combination. By using the same size for TM-specific DCI formats, the base station 502 may limit the amount of blind detection performed by the UE 504.

In certain implementations of the first example, a first DCI format with a legacy radio network temporary identifier (RNTI) for the UE may be used to indicate a first TM of the combination, and a second DCI format (e.g., different than the first DCI format) with a new RNTI for the UE may be used to indicate the second TM in the combination. The new RNTI can be implemented as a new cyclic redundancy check (CRC) mask for the second DCI format. Thus, when base station transmits DCI 505 including a CRC to the UE, the CRC may be scrambled based on the legacy RNTI to indicate the first TM in the combination associated with the first DCI format, or the CRC may be scrambled based on the new RNTI to indicate the second TM in the combination associated with the second DCI format. In certain configurations, the second DCI format may include padding (e.g., zero padding). The padding may be appended to the second DCI format so that the second DCI format with the new RNTI is the same size as the first DCI format with the legacy RNTI. For example, DCI format 2 with a CRC scrambled based on the legacy RNTI may be used to indicate TM4 with 4 antennas, and DCI format 2C with a CRC scrambled based on the new RNTI (e.g., new CRC mask) may be used to indicate TM9. Because DCI format 2 has a larger size than DCI format 2C, the base station 502 may pad DCI format 2C with extra bits so that the UE 504 is performing blind detection for DCI formats of the same size. However, in certain other configurations, the second DCI format may not include padding.

In certain other implementations of the first example, the first TM of the combination may be indicated with a new DCI format (e.g., DCI format 2E) that includes a legacy DCI format for the first TM with a flag bit appended thereto which may be used to indicate when to dynamically switch to a first TM of the combination. In certain configurations, the second TM of the combination may be indicated with a new DCI format (e.g., DCI format 2F) that includes a legacy DCI format for the second TM with a flag bit appended thereto which may be used to indicate when to dynamically switch to a second TM of the combination. The flag bit may be appended to the front or back of the DCI, or any location there between. Thus, when base station transmits DCI 505 to the UE including the flag bit, the flag bit may read '0', for example, to indicate the first TM in the combination associated with the first DCI format, and the flag bit may read '1', for example, to indicate the second TM in the combination associated with the second DCI format. The bits may alternatively read vice-versa. The new DCI format of the second TM may also include additional padding bits so that the new DCI format for the first and second TM have the same size. For example, the TM4 may be indicated with DCI format 2 with the flag bit appended thereto (e.g., new DCI format 2E), and TM9 may be indicated with DCI format 2C with the flag bit appended that includes padding (e.g., new DCI format 2F), so that the DCI formats for the TM4 and TM9 have the same size. However, in certain other configurations, the second DCI format may not include padding.

In certain other implementations of the first example, the first TM of the combination may be indicated using a legacy DCI format (e.g., the DCI format with the largest size—DCI format 2D, although other DCI formats are possible) that includes a first set of quasi-colocation information (QCI) bits (e.g., 2-bit PDSCH mapping QCI) defined thereto, and the second TM of the combination may be indicated with the same legacy DCI format that includes a second set of QCI bits. The QCI bits of DCI format 2D may be redefined to indicate the TM-specific DCI format. Thus, when base station transmits DCI 505 of DCI format 2D to the UE including the redefined QCI bits, the QCI bits may read '00' to indicate the first TM in the combination associated with a first DCI format, '01' to indicate the second TM in the combination associated with a second DCI format, and '10' to indicate the third TM in the combination associated with a third DCI format, and '11' may be reserved. Alternatively, any other combination mapping QCI bits to DCI formats/TMs may be possible (e.g. '00' may be reserved, and '01', '10', and '11' may be used to indicate respective DCI formats and TMs). For example, TM9 (associated with DCI format 2C) may be indicated with DCI format 2D with QCI bits '00', TM3 (associated with DCI format 2A) may be indicated with DCI format 2D with QCI bits '01', TM4 (associated with DCI format 2 with 2 antennas) may be indicated with DCI format 2D with QCI bits '10', and a DCI format 2D with QCI bits '11' may be reserved.

At 507, the UE may switch to the TM from the combination signaled at 501 in response to receiving the indication in DCI 505. Although only a single DCI is indicated, if the network indicates the TM switching based on the redefined bits in the DCI, the base station may send the DCI indicating to the UE to switch to the other TM from the combination signaled at 501. Thus, the UE may dynamically switch TM from among combination(s) signaled to the UE at 501 based on DCI received from the base station.

Table 2 seen below indicates the information indicated by the TM-specific DCI formats (e.g., in USS). For example, the TM-specific DCI formats may indicate an associated TM, transport block size, MCS, new data indicator (NDI), redundancy version (RV), PMI/RI, number of spatial layers, DMRS scrambling, APs, special fields, and number of bits for each DCI format when 2 antennas and 4 antennas are used.

TABLE 2

DCI Format Information

| DCI format with USS | DCI for Transport block(s) | PMI/RI | #layers/DMRS scrambling/APs | Other special fields | Bits (e.g., 20 MHz) for 2 or 4 antenna ports |
|---|---|---|---|---|---|
| DCI format 1A | 1 × 8 bits | — | — | 1 bit SRS request for TDD | 30 bits for FDD 34 bits for TDD |
| DCI format 2A (for TM3) | 2 × 8 bits + 1 | 0 bits for 2 antenna ports 2 bits for 4 antenna ports | — | | 50 or 52 bits for FDD 53 or 55 bits for TDD |
| DCI format 2 (for TM4) | 2 × 8 bits + 1 | 3 bits for 2 antenna ports 6 bits for 4 antenna ports | — | | 53 or 56 bits for FDD 56 or 59 bits for TDD |
| DCI format 2B (for TM8) | 2 × 8 bits + 1 | — | 1-bit scrambling ID | 1 bit SRS request for TDD | 51 bits for FDD 55 bits for TDD |
| DCI format 2C (for TM9) | 2 × 8 bits + 1 | — | 3 bits | 1 bit SRS request for TDD | 53 bits for FDD 57 bits for TDD |
| DCI format 2D (for TM10) | 2 × 8 bits + 1 | — | 3 bits | 1 bit SRS request for TDD 2-bit PDSCH mapping QCI | 55 bits for FDD 59 bits for TDD |

In the PDCCH/EPDCCH region in a DL radio frame, there may be multiple places where a specific PDCCH is located, and the UE 504 may search all the possible locations within the related searching space. The PDCCHs may be constructed from the CCEs in the control region of a subframe. The possible location for a PDCCH differs depending on whether the PDCCH is UE-Specific or Common, and also depend on the aggregation level. All possible locations for PDCCH may be referred to as the 'Search Space,' and each of the possible locations may be referred to as the 'PDCCH Candidates'. The search space indicates a set of CCE locations where the UE 504 may find the associated PDCCHs. Each PDCCH may carry one DCI and may be identified by an RNTI. The RNTI may be implicitly encoded in the CRC attachment of the DCI. Table 3 shows example relationships between search space, aggregation level, size in CCEs, and the number of PDCCH candidates.

TABLE 3

Search Space and PDCCH Candidates

| | Search space | | Number of |
|---|---|---|---|
| Type | Aggregation level | Size [in CCEs] | PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Multiple aggregation levels may be used to support multiple DCI formats with different DCI size (e.g., the size may greatly vary depending on the format), FDD/TDD mode and channel bandwidth. In another aspect, the ratio between DCI size and the PDCCH size may indicate the effective coding rate. For the same DCI format, higher aggregation levels may provide more robust coding and reliability for the UE 504 under poor channel conditions. For a UE 504 in good channel conditions, lower aggregation levels may save resources. The aggregation level for control messages can be 4 or 8, while the aggregation level for UE-specific allocation can be 1 or 2 or 4 or 8. The higher the aggregation level used, the better the probability that the UE 504 may successfully decode the DCI. When a lower aggregation level is used, the overhead sent to the UE 504 may be reduced, thereby increasing the capacity of the PDCCH or EPDCCH.

In a second example, the UE 504 may monitor (at 503) different sized DCI using a reduced number of PDCCH candidates and/or aggregation levels as compared to the number of PDCCH candidates and/or aggregation levels seen in Table 3. By using a reduced number of PDCCH candidates and/or aggregation levels, the base station 502 may limit the amount of blind detection performed by the UE 504.

In certain implementations of the second example, a first DCI format of a first size may be used to indicate a first TM of the combination and a second DCI format of a second size may be used to indicate a second TM of the combination. The number of PDCCH candidates and/or aggregation levels associated with the first DCI format and the second DCI format may be reduced as compared to the number of PDCCH candidates seen in Table 3 above. For example, DCI format 2A may be used to indicate TM 3 and DCI format 2B may be used to indicate TM8, and the UE 504 may monitor the DCI format 2A size using three PDCCH candidates for TM3 and monitor the DCI format 2B size using three PDCCH candidates for TM8. The UE 504 may monitor the reduced number of PDCCH candidates and/or aggregation levels seen below in Table 4a and Table 4b.

TABLE 4a

Reduced Number of PDCCH Candidates

| | Search space | | Number of |
|---|---|---|---|
| Type | Aggregation level | Size [in CCEs] | PDCCH candidates |
| UE-specific - TM#1 or TM#2 | 1 | 6 | 3 |
| | 2 | 12 | 3 |
| | 4 | 8 | 1 |
| | 8 | 16 | 1 |
| Common | 4 | 16 | 4 |
| | 8 | 16 | 2 |

TABLE 4b

Reduced Number of Aggregation levels

| Type | Search space Aggregation level | Size [in CCEs] | Number of PDCCH candidates |
|---|---|---|---|
| UE-specific - TM#1 or TM#2 | 2 | 12 | 6 |
|  | 8 | 16 | 2 |
| Common | 4 | 16 | 4 |
|  | 8 | 16 | 2 |

In certain other implementations of the second example, a first DCI format of a first size may be used to indicate a first TM of the combination and a second DCI format of a second size may be used to indicate a second TM of the combination. The number of PDCCH candidates and/or aggregation levels associated with the first DCI format and the second DCI format may be separate for each TM in contrast to the candidates and levels seen in Tables 4a and 4b above. The UE 504 may monitor a first set of PDCCH candidates (e.g. C1, C2, C3, C4—each with a potentially different set of CCEs) for the first DCI format for the first TM, and a second set of PDCCH candidates (e.g., C1', C2'—each with a potentially different set of CCEs) for the second DCI format for the second TM. The CCEs between C1 and C1' may be different. The UE 504 may monitor the different sets of reduced PDCCH candidates and/or aggregation levels seen below in Table 5a and Table 5b.

TABLE 5a

Reduced Number of PDCCH Candidates

| Type | Search space Aggregation level | Size [in CCEs] | Number of PDCCH candidates |
|---|---|---|---|
| UE-specific - TM #1 | 1 | 6 | 4 |
|  | 2 | 12 | 4 |
|  | 4 | 8 | 1 |
|  | 8 | 16 | 2 |
| UE-specific - TM #2 | 1 | 6 | 2 |
|  | 2 | 12 | 2 |
|  | 4 | 8 | 1 |
|  | 8 | 16 | 0 |
| Common | 4 | 16 | 4 |
|  | 8 | 16 | 2 |

TABLE 5b

Reduced Number of Aggregation levels and/or PDCCH Candidates

| Type | Search space Aggregation level | Size [in CCEs] | Number of PDCCH candidates |
|---|---|---|---|
| UE-specific - TM #1 | 2 | 12 | 6 |
|  | 4 | 8 | 2 |
|  | 8 | 16 | 2 |
| UE-specific - TM #2 | 2 | 12 | 4 |
|  | 8 | 16 | 2 |
| Common | 4 | 16 | 4 |
|  | 8 | 16 | 2 |

The base station 502 may transmit (at 505) the DCI format indicating one of the TMs in the combination based on one of the implementations and/or examples described above. The UE 504 may receive downlink transmissions via a PDSCH based at least in part on the configured TM, and process the downlink transmissions based on the configured TM. During the same RRC connection the TM used by the UE 504 for receiving and processing downlink transmissions may change using, e.g., one of the implementations and/or examples described above.

Figure 6:
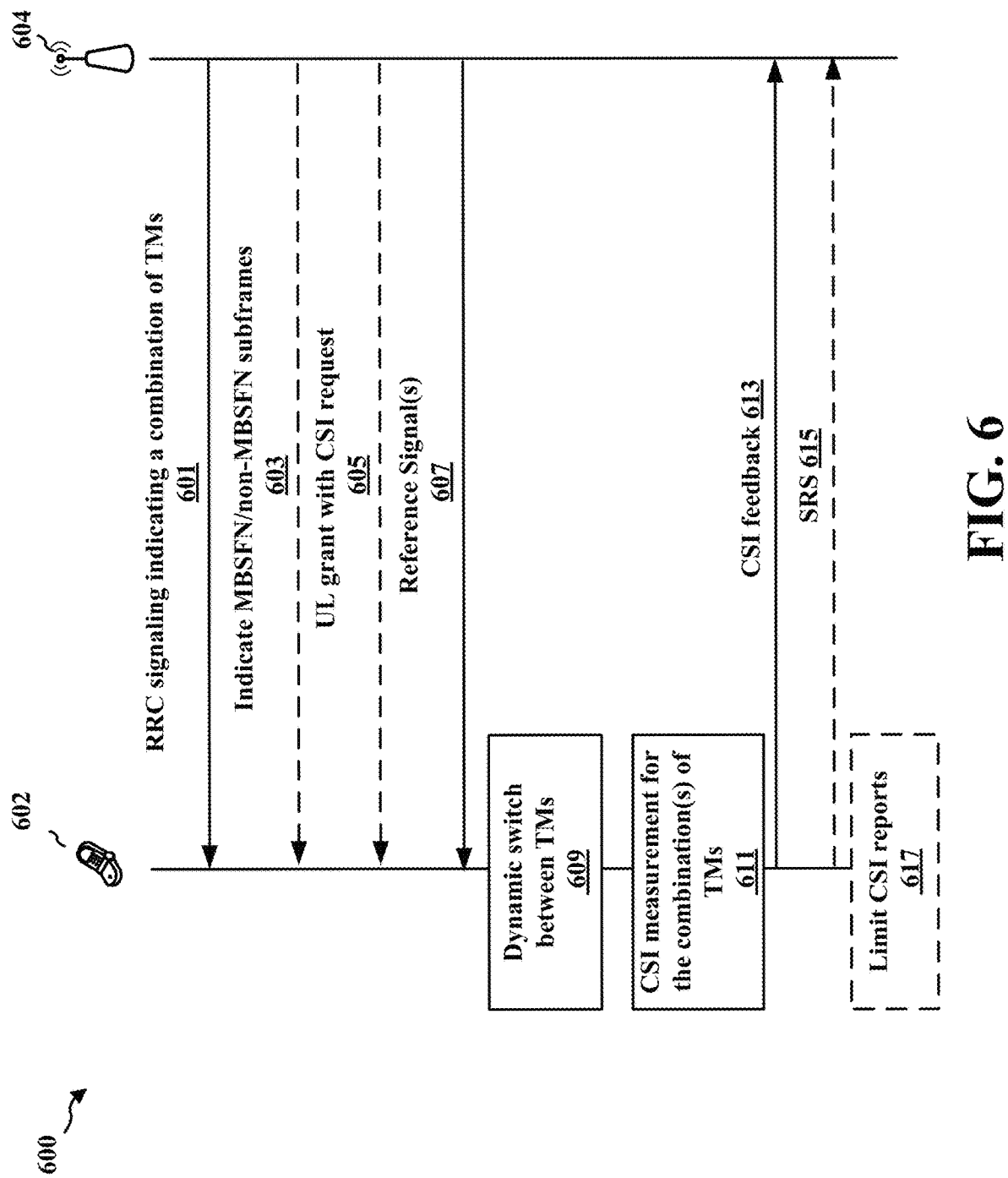
FIG. 6 illustrates an example communication flow between a base station and a UE including CSI feedback in accordance with aspects of the disclosure.

FIG. 6 illustrates another example in which a base station may configure a UE with a combination of TMs (e.g., TM 3+TM 8, TM 3+TM 9, TM 4+TM 8, TM 4+TM9, TM3+TM4+TM8, TM3+TM4+TM9, etc.) via RRC signaling, e.g., as described below in connection with any of FIGS. 6 and 13-18. FIG. 6 illustrates an example communication flow 600 between a UE 602 and base station 604 that includes configuring the UE for dynamic transmission mode switching as described above with respect to FIG. 5. As illustrated at 601, the base station may signal the UE a combination of transmission modes. The combination may include at least a first transmission mode and a second transmission mode.

CSI feedback may become burdensome for a UE to perform for combinations of TMs and may also require an undesirable amount of overhead for a base station to receive CSI reports for such TM combinations. When a UE is configured for a single transmission mode, the UE will be configured via RRC signaling to use a reference signal for performing CSI measurements for that transmission mode. However, for combinations of transmission modes, this could lead to a UE being required to monitor multiple reference signals. Aspects presented herein enable dynamic transmission mode switching and corresponding CSI feedback in a manner that reduces the burden on the UE and that improves efficient use of wireless resources.

Different transmission modes may have demodulation based on different reference signals, which may include, e.g. CRS, CSI-RS, SRS, Demodulation Reference Signal (DMRS), Phase Tracking Reference Signal (PTRS), and Tracking Reference Signal (TRS). As shown in Table 1 above, for example, TM3 and TM4 are based on CRS in LTE, whereas TM8, TM9, and TM10 are based on DM-RS. As well, the different transmission modes may require the UE to monitor different RS and provide different CSI feedback. In one example, Table 1 illustrates that CRS-based measurement and CSI feedback may be used in connection with TM4, whereas TM9 requires CSI-RS-based measurement and CSI feedback. However, any reference signal may be used in connection with different TMs. In addition, SRS-based UL CSI can be used as DL CSI for Time Division Duplex (TDD) mode. TM8 and TM10 are shown as having different RS-based measurement and CSI feedback than TM4 and TM9. The different types of feedback for different transmission modes can lead to a large amount of CSI feedback for combinations of transmission modes, e.g., for dynamic transmission mode switching.

Any of a number of aspects may be employed to enable the UE 602 to perform CSI measurement for combinations of transmission modes, e.g., in connection with dynamic transmission mode switching. For example, at 609, the UE may dynamically switch between the different transmission modes in the combination signaled to the UE at 601. The UE might use one of the transmission modes most of the time, e.g., in a combination of TM4 and TM8, the UE might spend most of the time in TM4. However, when particular circumstances occur that would make TM8 more suitable, the UE may dynamically switch to TM8. The base station may prioritize a transmission mode within the combination.

In a first example, for TDD, as well as Frequency division Duplex (FDD), the UE 602 may use particular reference signals for certain combinations of transmission modes. For example, the base station may transmit reference signals 607, such as CRS and CSI-RS. For combinations of transmission modes comprising TM4 and TM8, the UE may monitor CRS and perform CSI measurement 611 and send CSI feedback 613 based on the CRS. When the combination comprises TM9, the UE may monitor for CSI-RS and measure CSI based on the CSI-RS. Thus, for combinations including only TM3, TM4, and/or TM8, the UE may use the same downlink reference signal, e.g., CRS, to perform CSI measurements for the combination. In contrast, when the combination includes TM9, the UE may use two reference signals (e.g. CRS and CSI-RS) to perform the CSI measurements. The two CSI measurements may be performed at the same time or at different times in a Time Division Multiplexed (TDM) manner based on the configuration of the CSI-RS. For example, the UE may measure CSI using CSI-RS for TM9 and using CRS for the other transmission mode in the combination. Thus, in this first example, the UE may need to determine whether to monitor for a single reference or two different reference signals. The determination may be based on the transmission modes within the combination signaled to the UE by the base station.

In a second example, a unified reference signal may be used to perform CSI measurements for two different transmission modes. The unified reference signal may be based on any reference signal in NR or LTE. For example, the unified reference signal may be based on CRS. Thus, the term "unified" reference signal represents a reference signal which may be used for CSI measurements in multiple transmission modes. For example, a CRS based CSI measurement may be performed at 611, even for TM9 (which generally uses CSI-RS). However, in this example, a CRS based PMI and/or RI selection may be defined for one of the transmission modes, e.g., TM9. No additional configuration for CSI-RS may be needed to support CSI feedback of TM9. This CRS based selection of PMI and/or RI could be used for CRS-based CQI as well. The inclusion of PMI/RI/CQI feedback enables CSI measurements for TM9 based on CRS. While the UE may perform measurements on the same, unified reference signal, the PMI/RI/CQI enables the UE to apply these factors to adjust the measurements performed by the UE for the particular transmission mode. As TM9 typically relies on CSI-RS, a mapping may be provided between CRS and CSI-RS, such as antenna ports, power offset, beam gain, etc. The mapping may be indicated to the UE and/or may otherwise be known to the UE.

In another example, the unified reference signal may be based on CSI-RS. A CSI-RS based PMI/RI selection may be defined for one of the transmission modes in NR or LTE. For example, a CSI-RS based PMI/RI selection may be defined, e.g., for TM4 and TM8, which typically use CRS in LTE. As with the CRS example, a mapping may be provided between CRS and CSI-RS, such as antenna ports, power offset, beam gain, etc. CSI-RS may have some additional beamforming applied by the base station, and the beam gain might not be known to the UE. In contrast, CRS may be a broadcast reference signal that does not include additional precoding. While a different reference signal may be used to perform CSI measurement for transmission mode in a combination than would be used for the same transmission mode as a single transmission mode, the base station may use the CSI feedback to infer the necessary information to continue communication with the UE.

In a third example, a configuration of CSI process(es) may be enabled for the combination of transmission modes for which the UE is configured. For example, at 611, the UE may measure a reference signal(s) based on a first CSI process for the first transmission mode in the combination and a second CSI process for the second transmission mode. The different CSI processes may be configured as CSI subframe sets, e.g., $C_{CSI,0}$ and $C_{CSI,1}$. For example, the first CSI process, based on $C_{CSI,0}$ may be performed for any of TM3, TM4, and/or TM8. The second CSI process, e.g., based on $C_{CSI,1}$, may be used for TM9. The UE may similarly send separate CSI reports for each CSI process. For example, at 613, the UE may report a first CSI based on the first CSI process for the first transmission mode and may separately send a second CSI report based on the second CSI process based on the second transmission mode. In another example, the UE may provide a compacted CSI reporting that comprises CSI information based on the two different CSI processes. The different CSI processes could be independently configured, e.g., the first CSI process may be used for TM3, TM4 and/or TM8 and may have no precoding/beamforming on a non-zero-power CSI-RS (NZP-CSI-RS), similar to CRS; while the second CSI process may be used for TM9 and may have precoding/beamforming on the NZP-CSI-RS, where the precoding/beamforming may be transparent to the UE.

In a fourth example, a single CSI process may be used for each of the transmission modes of the combination, e.g., including TM4 or TM8 along with TM9. The UE may provide a compacted CSI reporting based on the single CSI process for both the first and second transmission modes. The compacted reporting may include sending a single CSI report that comprises CSI information for each transmission mode in the combination.

A fifth example may be applied for CSI measurement for TDD communication. In this fifth example, CSI feedback may be provided using a combination of CRS based measurement/feedback and SRS based measurement. For example, the UE may measure CRS for a first transmission mode in the combination and may transmit SRS, at 615, for a second transmission mode in the combination. The UE may transmit a SRS for the second transmission mode, e.g., when the UE receives signaling for the combination of transmission modes, and may measure a downlink reference signal for the first transmission mode when the UE receives signaling for the first transmission mode as a single transmission mode. On the other hand, the base station may receive the SRS from the UE and measure the UL CSI to use for the DL CSI based on DL/UL reciprocity in a TDD mode. The DL CSI based on the SRS measurement may be used for the second transmission mode. For example, the UE may measure CRS for TM4 as a single transmission mode and may transmit SRS for TM8 and/or TM9, when TM8 and/or TM9 are in a combination with TM4.

A sixth example may be applied for CSI measurements for TDD communication. The UE may transmit an SRS for both the first transmission mode and the second transmission mode. The base station may receive the SRS from the UE and measure the UL CSI to use the measurement for determining the DL CSI based on DL/UL reciprocity in TDD mode. The DL CSI that the base station determines based on the SRS measurement from the UE may be used for both the first transmission mode and second transmission mode. In this sixth example, an SRS based PMI/RI selection and possibly CQI may be defined for TM4. This alternative may also be applied to TM3 for CQI measurement only without PMI/RI. For example, if only TM3 is configured, CRS may be used to measure CQI. If TM3 and TM9 are configured for dynamic transmission mode switching, the UE may send SRS so that the base station may measure CQI for TM3 and CQI+PMI/RI for TM9.

Once the UE has measured the CSI at 611, any of a number of aspects may be applied to the CSI reporting 613 from the UE to the base station. The UE may perform periodic and/or aperiodic CSI reporting. The reporting may be transmitted to the base station on a control channel, e.g., PUCCH, or on a data channel, e.g., PUSCH. Table 6 shows a number of different reporting modes and examples of possible parameters for the reporting modes. With dynamic transmission mode switching, the UE may need to determine which reporting mode to use to report CSI feedback to the base station.

TABLE 6

Periodic and Aperiodic CSI Reporting Modes

| | Aperiodic CSI Reporting Mode | | | | Periodic CSI Reporting Mode | | | |
|---|---|---|---|---|---|---|---|---|
| | BW | UE selected subbands | | Configured Subbands | BW | | UE selected subbands | |
| TM | Mode 1-2 | 2-0 | 2-2 in | 3-0 | 3-1 | 1-0 | 1-1 | 2-0 | 2-1 |
| TM 4/8/9 | Wideband (WB) CQI Selective (Sel) PMI | Sel CQI No PMI | Sel CQI Sel PMI | Sel CQI No PMI | Sel CQI WB PMI | WB CQI No PMI | WB CQI WB PMI | Sel CQI No PMI | Sel CQI WB PMI |

In one CSI reporting example, the UE may transmit CSI reports in a periodic reporting mode, e.g., on PUSCH or PUCCH. The CSI feedback may be based on a different time offset with a same or different periodicity for each transmission mode in the combination, or based on a same time offset with a different periodicity for the transmission modes in the combination. Thus, the UE may report a first CSI having a first time offset for the first transmission mode and a second CSI having a second time offset for the second transmission mode. Similarly, the UE may report a first CSI having a first time offset and first periodicity for the first transmission mode and a second CSI having a second time offset and a second periodicity for the second transmission mode. The base station may configure the UE with a separate periodicity and/or offset for the first transmission mode and the second transmission mode. In one example, the time offset/periodicity may be based on a configuration of MBSFN and non-MBSFN subframes. For example, a first time offset may be used for MBSFN subframes and a second time offset may be used for non-MBSFN subframes.

In another CSI reporting example, the UE may provide CSI information for multiple transmission modes together. A single periodicity and/or time offset for CSI reporting may be signaled to the UE. The UE may then combine the CSI information for multiple transmission modes together and report the combined CSI information to the base station. In order to limit the complexity to the UE and/or the overhead for CSI reporting, the UE or base station may limit PMI/RI for the CSI reporting. For example, the UE may perform the reporting without a PMI. In another example, the UE may use a single subband PMI. In another example, the UE may limit PMI to a predefined number of PMI. In this example, for a combined CSI report based on a shared time offset and/or periodicity for the transmission modes in the combination, the UE may use PUCCH format 4 or 5 to report the CSI at 613. The PMI/RI for the transmission modes may be the same or may be separate. Thus, first CSI information for the first transmission mode may be based on a first PMI/RI, and second CSI information for the second transmission mode may be based on a second PMI/RI. In another example, CSI information for both the first and second transmission mode may be based on the same PMI/RI.

In yet another example, the UE may report the CSI feedback in an aperiodic mode. The aperiodic CSI may be reported, e.g., on PUSCH. As this reporting mode is aperiodic, the base station may need to trigger the CSI report from the UE. As illustrated at 605, the base station may send an uplink grant to the UE with a CSI request to trigger an aperiodic CSI report from the UE. The CSI request may comprise only a few bits of the uplink grant. For example, the CSI request may comprise two bits, e.g. in DCI format 0. RRC signaling from the base station to the UE may indicate the correspondence between the two-bit signaling in the uplink grant and the transmission mode-specific CSI feedback that is being requested by the base station. The mapping relationship between the TM-specific CSI feedback and the two-bit signaling in the UL grant may be configured, e.g., by the RRC signaling or may be predefined. For example, '00' may be used for a CSI request in an UL grant to trigger CSI feedback for the first transmission mode, '01' may be used for a CSI request in the UL grant to trigger CSI feedback for the second transmission mode, '10' may be used for a CSI request in the UL grant to trigger CSI feedback for the first transmission mode and the second transmission mode at the same time, and '11' may be used for a CSI request in the UL grant to indicate no CSI feedback for the first transmission mode and the second transmission mode. In response to the uplink grant and CSI request at 605, the UE may provide the CSI feedback at 613.

In yet another example, the UE may report the CSI feedback in a combination of periodic and aperiodic modes. For example, a periodic CSI may be reported at 613 for a first transmission mode, while an aperiodic CSI may be reported at 613 for a second transmission mode. In another example, a periodic CSI may be reported for both the first and the second transmission mode and an aperiodic CSI may be reported for both the first and the second transmission mode. The periodic CSI may comprise less information than the aperiodic CSI, e.g., a wideband CSI, limited or no PMI, etc. The aperiodic CSI may comprise additional information, e.g., comprising subband information, selected PMI, etc.

The UE and/or base station may place a limit on the number of CSI reports sent from the UE to the base station, at 617. For example, a UE may consider whether the UE is configured with more than one CSI process for a serving cell. For example, the UE may consider the limit when the UE receives an aperiodic CSI report request triggering a CSI report. For example, the UE might not update CSI corresponding to a CSI reference resource for all CSI processes except the $\max(N_x - N_u, 0)$ lowest indexed CSI processes for the serving cell associated with the request where $N_x$ is the maximum number of CSI process supported by the UE for the serving cell and when the UE has $N_u$ unreported CSI processes associated with other aperiodic CSI Still referring to FIG. 6, the base station transmits reference signal(s) 607. These reference signal(s) may be used by the UE to perform CSI measurement and reporting in connection with dynamic transmission mode switching. For TM3 and TM4, the CRS may be used by the UE, and the CRS may always be transmitted by the base station, e.g., at 607. As CRS is always transmitted, the UE will be able to monitor for CRS whenever the UE has switched to TM3 or TM4. In contrast, TM8 and TM9 may be based on DM-RS, and, the base station may transmit DM-RS only in subframes in which the UE has switched to either TM8 or TM9. Thus, DM-RS may be dynamically turned on by the base station in connection with the UE switching to a DM-RS based transmission mode. Otherwise, the DM-RS may be turned off, e.g., the base station may refrain from transmitting the DM-RS.

Aspects presented herein may be applied to an example including MBSFN and non-MBSFN subframes. For example, one transmission mode may be applied for MBSFN subframes, and a second transmission mode may be applied for non-MBSFN subframes. For example, a UE may switch to TM9 for MBSFN subframes, e.g., TM9 with a 4×4 configuration. For non-MBSFN subframes, the UE may dynamically switch between TM3, TM4, TM8 or TM9. Additionally, the UE may perform CSI measurement and/or CSI reporting based on the MBSFN/non-MBSFN configuration.

The configuration of MBSFN and non-MBSFN subframes may be configured in a semi-static manner. For example, the UE may receive an indication 603 of MBSFN subframes and non-MBSFN subframes from the base station. Then, the UE may perform switching to a first transmission mode, e.g., TM9, for the MBSFN subframes and switching to a second transmission mode, e.g., TM4, for the non-MBSFN subframes. In this case, although the dynamic DCI for MBSFN subframes/non-MBSFN subframes is not needed, the CSI measurement/reporting may be configured similar to the example described for dynamic transmission mode switching.

The UE may monitor an aperiodic CSI-RS and perform aperiodic CSI reporting for longer MBSFN periods. For shorter MBSFN periods, the UE may monitor periodic CSI-RS and perform periodic CSI reporting. The periodic CSI-RS and CSI reporting may be based on a different time offset and/or periodicity than other CSI reports.

Figure 7:
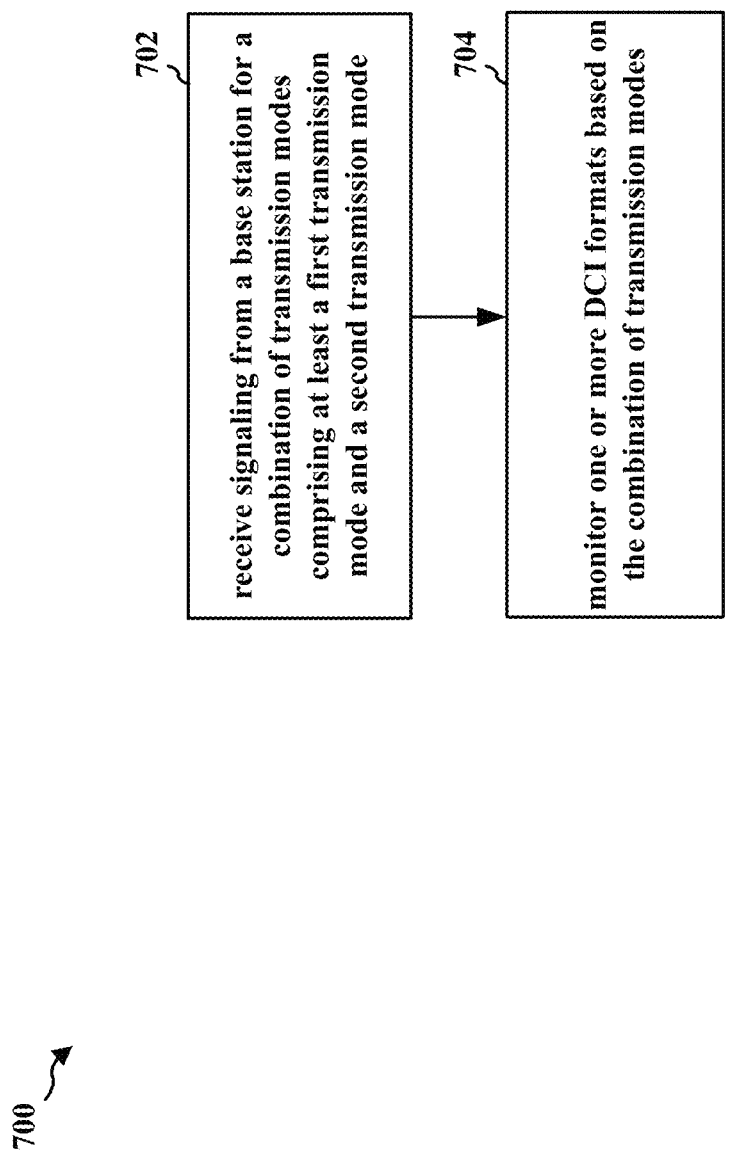
FIG. 7 is a flowchart of a method of wireless communication of a UE.

FIG. 7 is a flowchart 700 of a method of wireless communication. The method may be performed by a UE (e.g., the UE 104, 350, 504, 602, 1150, the apparatus 802/802'; the processing system 914, which may include the memory 360 and which may be the entire UE 350 or a component of the UE 350, such as the TX processor 368, the RX processor 356, and/or the controller/processor 359). The method enables a UE to accomplish dynamic TM mode switching through the reception of signaling indication TM combination(s) and monitoring for DCI indication a TM from the signaled combination(s).

At 702, the UE may receive signaling from a base station for a combination of transmission modes comprising at least a first transmission mode and a second transmission mode. For example, referring to FIG. 5, the UE 504 may receive (at 501) RRC signaling that indicates a combination of TMs that may be used for downlink communications during the RRC connection. For example, the RRC signaling may indicate a combination that includes TM 3+TM 8, TM 3+TM 9, TM 4+TM 8, TM 4+TM9, TM3+TM4+TM8, TM3+TM4+TM9, just to name a few. Although, a single RRC signal is illustrated as indicating the combination of TMs in FIG. 5, more than one RRC signal, RRC object, and/or variable type of RRC message may be used to indicated the combination of TMs. In certain aspects, the RRC signaling may include multiple RRC signals. For example, a first RRC signal may be sent that indicates the first TM of the combination, and a second RRC signal may be sent that indicates the second TM of the combination. Alternatively, a legacy RRC signal that includes a legacy field that indicates the first TM of the combination may also include a new field to indicate the second TM of the combination.

At 704, the UE may monitor one or more DCI formats based on the combination of transmission modes. In one aspect, the first DCI format and the second DCI format are monitored based on a same size DCI format for the first DCI format and the second DCI format. For example, referring to FIG. 5, the UE 504 may monitor (at 503) one or more DCI formats with the same size for each of the TMs in the combination or with different sizes and with a reduced number of PDCCH candidates and/or aggregation levels.

In a first aspect, the one or more DCI formats may comprise a first DCI format associated with the first transmission mode and a second DCI format associated with the second transmission mode. In certain other aspects, a first size of the first DCI format may be equal to a second size of the second DCI format with additional padding bits. In certain other aspects, a first size of the first DCI format may be equal to a second size of the second DCI format with no additional padding bits. In certain other aspects, the first DCI format is detected using a first RNTI and the second DCI format is detected using a second RNTI. In certain other aspects, the first RNTI may be different than the second RNTI. For example, referring to FIG. 5, a first DCI format with a legacy RNTI may be used to indicate a first TM of the combination, and a second DCI format (e.g., different than the first DCI format) with a new RNTI may be used to indicate the second TM in the combination. In certain configurations, the second DCI format may include padding (e.g., zero padding). The padding may be appended to the second DCI format so that the second DCI format with the new RNTI is the same size as the first DCI format with the legacy RNTI. For example, DCI format 2 with a legacy RNTI may be used to indicate TM4 with 4 antennas, and DCI format 2C with a new RNTI (e.g., new CRC mask) may be used to indicate TM9. Because DCI format 2 has a larger size than DCI format 2C, the base station 402 may pad DCI format 2C with extra bits so that the UE 404 is performing blind detection for DCI formats of the same size. However, in certain other configurations, the second DCI format may not include padding.

In a second aspect, the one or more DCI formats may comprise a first DCI format associated with the first transmission mode and a second DCI format associated with the second transmission mode. In certain other aspects, the first DCI format and the second DCI format each may include at least one flag bit indicating one of the first transmission mode and the second transmission mode. In certain other aspects, a first size of the first DCI format may be equal to a second size of the second DCI format with additional padding bits. In certain other aspects, a first size of the first DCI format may be equal to a second size of the second DCI format with no additional padding bits. For example, referring to FIG. 5, the first TM of the combination may be indicated with a new DCI format (e.g., DCI format 2E) that includes a legacy DCI format for the first TM with a flag bit appended thereto which may be used to indicate when to dynamically switch to a first TM of the combination. In certain configurations, the second TM of the combination may be indicated with a new DCI format that includes a legacy DCI format for the second TM with a flag bit appended thereto which may be used to indicate when to dynamically switch to a second TM of the combination. The flag bit may be appended to the front or back of the DCI, or may be added to another location within the DCI. The new DCI format of the second TM may also include additional padding bits so that the new DCI format for the first and second TM have the same size. For example, the TM4 may be indicated with DCI format 2 with the flag bit appended thereto (e.g., new DCI format 2E), and TM9 may be indicated with DCI format 2C with the flag bit appended that includes padding (e.g., new DCI format 2F), so that the DCI formats for the TM4 and TM9 have the same size. However, in certain other configurations, the second DCI format may not include padding.

In a third aspect, the one or more DCI formats may comprise a first DCI format associated with the first transmission mode and a second DCI format associated with the second transmission mode. In certain aspects, the first DCI format includes a first set of QCI bits indicating the first transmission mode. In certain other aspects, the second DCI format includes a second set of QCI bits indicating the second transmission mode. In certain other aspects, the first set of QCI bits may be different than the second set of QCI bits. For example, referring to FIG. 5, the first TM of the combination may be indicated using a legacy DCI format (e.g., the DCI format with the largest size—DCI format 2D) that includes a first set of quasi-colocation (QCI) bits (e.g., 2-bit PDSCH mapping QCI) defined thereto, and the second TM of the combination may be indicated with the same legacy DCI format that includes a second set of QCI bits. For example, TM9 may be indicated with DCI format 2D with QCI bits '00' (e.g., DCI bits in DCI format 2D with QCI bits '00' indicate the DCI bits same as DCI format 2C for TM9), TM3 may be indicated with DCI format 2D with QCI bits '01' (e.g., DCI bits in DCI format 2D with QCI bits '01' indicate the DCI bits same as DCI format 2A for TM3), TM4 with 2 antennas may be indicated with DCI format 2D with QCI bits '10' (e.g., DCI bits in DCI format 2D with QCI bits '10' indicate the DCI bits same as DCI format 2 for TM4 with 2 antennas), and a DCI format 2D with QCI bits '11' may be reserved.

In a fourth aspect, the one or more DCI formats may comprise a first DCI format associated with the first transmission mode and a second DCI format associated with the second transmission mode. In certain other aspects, a first size of the first DCI format may be different than a second size of the second DCI format. In certain other aspects, a reduced number of PDCCH candidates or a reduced number of aggregation levels are monitored for each of the first DCI format and the second DCI format. For example, referring to FIG. 5, a first DCI format of a first size may be used to indicate a first TM of the combination and a second DCI format of a second size may be used to indicate a second TM of the combination. The number of PDCCH candidates and/or aggregation levels associated with the first DCI format and the second DCI format may be reduced as compared to the number of PDCCH candidates seen in Table 3 above. For example, DCI format 2A may be used to indicate TM 3 and DCI format 2B may be used to indicate TM8, and the UE 504 may monitor the DCI format 2A size using three PDCCH candidates for TM3 and monitor the DCI format 2B size using three PDCCH candidates for TM8. The UE 504 may monitor the reduced number of PDCCH candidates and/or aggregation levels seen above in Tables 4a and/or 4b.

In a fifth aspect, the one or more DCI formats may comprise a first DCI format associated with the first transmission mode and a second DCI format associated with the second transmission mode. In certain other aspects, a first size of the first DCI format may be different than a second size of the second DCI format. In certain other aspects, a first set of PDCCH candidates are monitored for the first DCI format. In certain other aspects, a second set of PDCCH candidates may be monitored for the second DCI format. In certain other aspects, the first set of PDCCH candidates and the second set of PDCCH candidates may include a different number of PDCCH candidates or a different number of aggregation levels. For example, referring to FIG. 5, a first DCI format of a first size may be used to indicate a first TM of the combination and a second DCI format of a second size may be used to indicate a second TM of the combination. The UE 504 may monitor a first set of PDCCH candidates (e.g. C1, C2, C3, C4—each with a potentially different set of CCEs) for the first DCI format for the first TM, and a second set of PDCCH candidates (e.g., C1', C2'—each with a potentially different set of CCEs) for the second DCI format for the second TM. The CCEs between C1 and C1' may be different. The UE 504 may monitor the different sets of reduced PDCCH candidates and/or aggregation levels seen above in Tables 5a and/or 5b.

Figure 8:
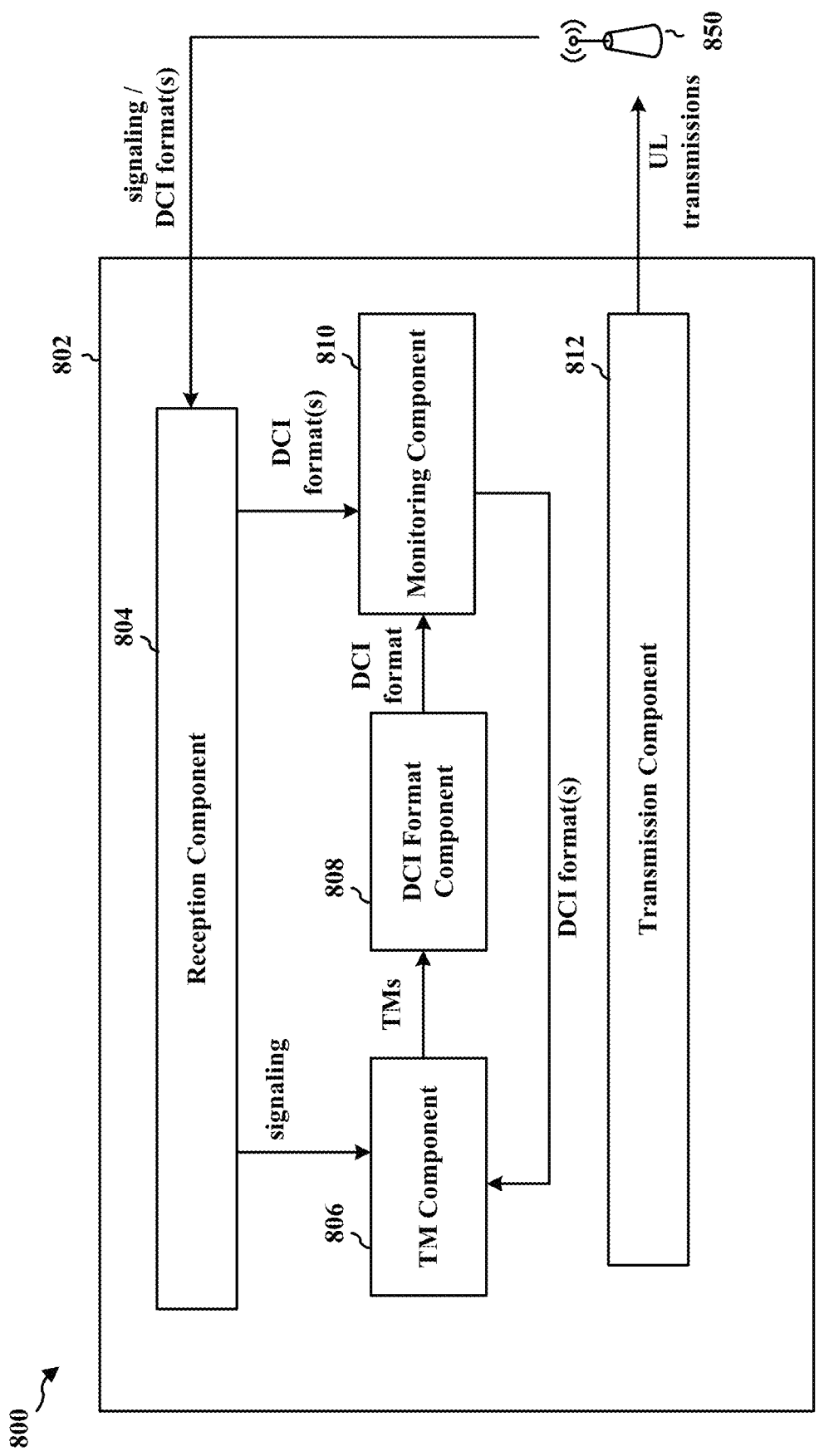
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE (e.g., the UE 104, 350, 504, 602, 1150, the apparatus 802') in communication with a base station 850 (e.g., the base station 102, 502, 604, eNB 310, the apparatus 1102/1102'). The apparatus may include a reception component 804, a TM component 806, a DCI format component 808, a monitoring component 810, and a transmission component 812.

The reception component 804 may be configured to receive signaling from the base station 850 for a combination of transmission modes comprising at least a first transmission mode and a second transmission mode. The reception component 804 may be configured to send the signal to the TM component 806. The TM component 806 may be configured to determine a combination of TMs for monitoring. The TM component 806 may be configured to send a signal indicating the combination of TMs to the DCI format component 808. The DCI format component 808 may be configured to determine DCI formats, DCI format sizes, PDCCH candidates, and/or aggregation levels for each TM in the combination. The DCI format component 808 may be configured to send a signal indicating the DCI formats, DCI format sizes, PDCCH candidates, and/or aggregation levels for each TM in the combination to the monitoring component 810.

The monitoring component 810 may be configured to monitor one or more DCI formats based on the combination of transmission modes via the reception component 804, e.g., as described in connection with 503 in FIG. 5 and/or 704 in FIG. 7. The reception component 804 may be configured to send the DCI formats to the monitoring component 810. The monitoring component 810 may be configured to send information associated with the DCI formats to the TM component 806 so that any downlink transmissions may be received and/or processed using the current TM of the combination of TMs.

The transmission component 812 may be configured to send one or more UL transmissions to the base station 850.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
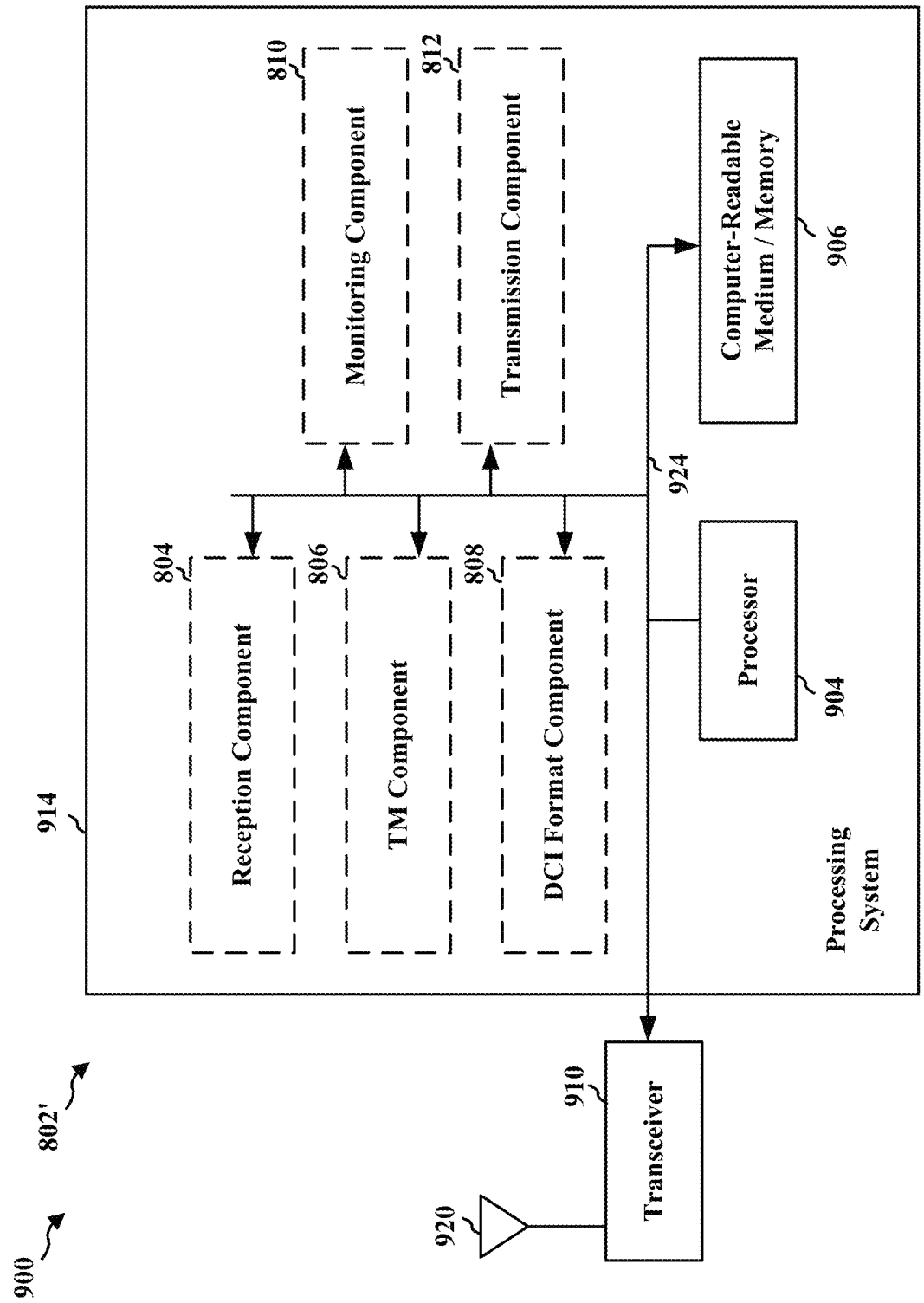
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In certain configurations, the apparatus 802/802' for wireless communication may include means for receiving signaling from the base station 850 for a combination of transmission modes comprising at least a first transmission mode and a second transmission mode. In certain other configurations, the apparatus 802/802' for wireless communication may include means for monitoring one or more DCI formats based on the combination of transmission modes, e.g., as described in connection with at least FIGS. 5 and 7. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
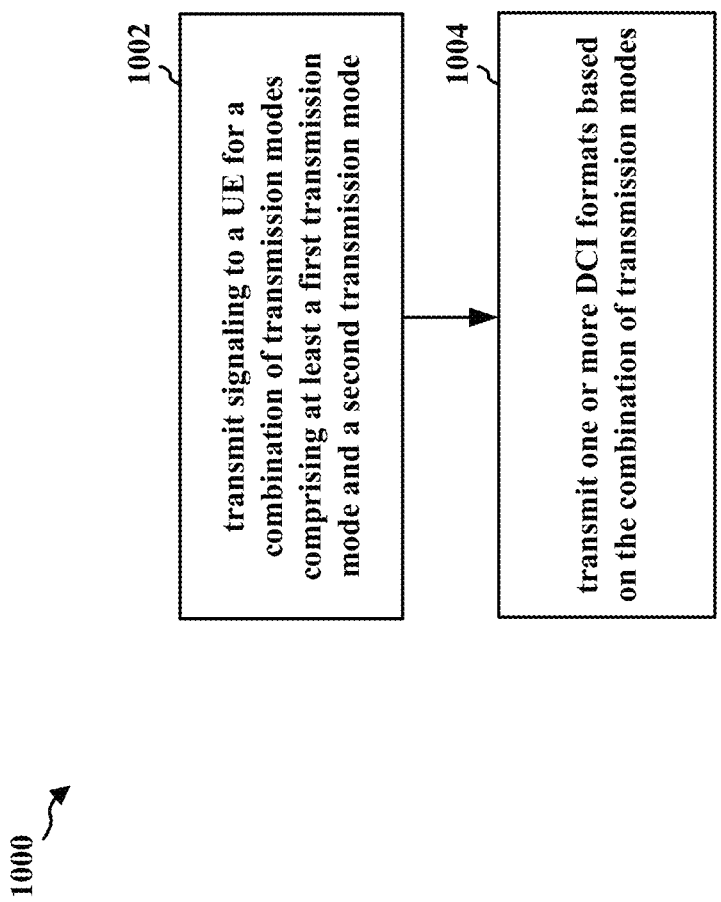
FIG. 10 is a flowchart of a method of wireless communication of a base station.

FIG. 10 is a flowchart 1000 of a method of wireless communication. The method may be performed by a base station (e.g., the base station 102, 502, 604, 850, eNB 310, the apparatus 1102/1102'; the processing system 1214, which may include the memory 376 and which may be the entire base station 310 or a component of the base station 310, such as the TX processor 316, the RX processor 370 and/or the controller/processor 375). The method enables a base station to dynamic trigger TM mode switching for a UE.

At 1002, the base station may transmit signaling to a UE for a combination of transmission modes comprising at least a first transmission mode and a second transmission mode. For example, referring to FIG. 5, the base station 502 may transmit (at 501) RRC signaling that indicates a combination of TMs that may be used for downlink communications during the RRC connection. For example, the RRC signaling may indicate a combination that includes TM 3+TM 8, TM 3+TM 9, TM 4+TM 8, TM 4+TM9, TM3+TM4+TM8, TM3+TM4+TM9, just to name a few. Although, a single RRC signal is illustrated as indicating the combination of TMs in FIG. 5, more than one RRC signal, RRC object, and/or variable type of RRC message may be used to indicated the combination of TMs. In certain aspects, the RRC signaling may include multiple RRC signals. For example, a first RRC signal may be sent that indicates the first TM of the combination, and a second RRC signal may be sent that indicates the second TM of the combination. Alternatively, a legacy RRC signal that includes a legacy field that indicates the first TM of the combination may also include a new field to indicate the second TM of the combination.

At 1004, the base station may transmit one or more DCI formats based on the combination of transmission modes. In one aspect, the first DCI format and the second DCI format may be transmitted with a same size for the first DCI format and the second DCI format. For example, referring to FIG. 5, the base station 502 may transmit (at 505) the DCI format indicating one of the TMs in the combination based on one of the example aspects described below.

In a first aspect, the one or more DCI formats may comprise a first DCI format associated with the first transmission mode and a second DCI format associated with the second transmission mode. In certain other aspects, a first size of the first DCI format may be equal to a second size of the second DCI format with additional padding bits. In certain other aspects, a first size of the first DCI format may be equal to a second size of the second DCI format with no additional padding bits. In certain other aspects, the first DCI format is transmitted using a first RNTI and the second DCI format is transmitted using a second RNTI. In certain other aspects, the first RNTI may be different than the second RNTI. For example, referring to FIG. 5, a first DCI format with a legacy RNTI may be used to indicate a first TM of the combination, and a second DCI format (e.g., different than the first DCI format) with a new RNTI may be used to indicate the second TM in the combination. In certain configurations, the second DCI format may include padding (e.g., zero padding). The padding may be appended to the second DCI format so that the second DCI format with the new RNTI is the same size as the first DCI format with the legacy RNTI. For example, DCI format 2 with a legacy RNTI may be used to indicate TM4 with 4 antennas, and DCI format 2C with a new RNTI (e.g., new CRC mask) may be used to indicate TM9. Because DCI format 2 has a larger size than DCI format 2C, the base station 502 may pad DCI format 2C with extra bits so that the UE 504 is performing blind detection for DCI formats of the same size. However, in certain other configurations, the second DCI format may not include padding.

In a second aspect, the one or more DCI formats may comprise a first DCI format associated with the first transmission mode and a second DCI format associated with the second transmission mode. In certain other aspects, the first DCI format and the second DCI format each may include at least one flag bit indicating one of the first transmission mode and the second transmission mode. In certain other aspects, a first size of the first DCI format may be equal to a second size of the second DCI format with additional padding bits. In certain other aspects, a first size of the first DCI format may be equal to a second size of the second DCI format with no additional padding bits. For example, referring to FIG. 5, the first TM of the combination may be indicated with a new DCI format (e.g., DCI format 2E) that includes a legacy DCI format for the first TM with a flag bit appended thereto which may be used to indicate when to dynamically switch to a first TM of the combination. In certain configurations, the second TM of the combination may be indicated with a new DCI format that includes a legacy DCI format for the second TM with a flag bit appended thereto which may be used to indicate when to dynamically switch to a second TM of the combination. The new DCI format of the second TM may also include additional padding bits so that the new DCI format for the first and second TM have the same size. For example, the TM4 may be indicated with DCI format 2 with the flag bit appended thereto (e.g., new DCI format 2E), and TM9 may be indicated with DCI format 2C with the flag bit appended that includes padding (e.g., new DCI format 2F), so that the DCI formats for the TM4 and TM9 have the same size. However, in certain other configurations, the second DCI format may not include padding.

In a third aspect, the one or more DCI formats may comprise a first DCI format associated with the first transmission mode and a second DCI format associated with the second transmission mode. In certain aspects, the first DCI format includes a first set of QCI bits indicating the first transmission mode. In certain other aspects, the second DCI format includes a second set of QCI bits indicating the second transmission mode. In certain other aspects, the first set of QCI bits may be different than the second set of QCI bits. For example, referring to FIG. 5, the first TM of the combination may be indicated using a legacy DCI format (e.g., the DCI format with the largest size—DCI format 2D) that includes a first set of quasi-colocation (QCI) bits (e.g., 2-bit PDSCH mapping QCI) defined thereto, and the second TM of the combination may be indicated with the same legacy DCI format that includes a second set of QCI bits. For example, TM9 may be indicated with DCI format 2D with QCI bits '00' (e.g., DCI bits in DCI format 2D with QCI bits '00' indicate the DCI bits same as DCI format 2C for TM9), TM3 may be indicated with DCI format 2D with QCI bits '01' (e.g., DCI bits in DCI format 2D with QCI bits '01' indicate the DCI bits same as DCI format 2A for TM3), TM4 with 2 antennas may be indicated with DCI format 2D with QCI bits '10' (e.g., DCI bits in DCI format 2D with QCI bits '10' indicate the DCI bits same as DCI format 2 for TM4 with 2 antennas), and a DCI format 2D with QCI bits '11' may be reserved.

In a fourth aspect, the one or more DCI formats may comprise a first DCI format associated with the first transmission mode and a second DCI format associated with the second transmission mode. In certain other aspects, a first size of the first DCI format may be different than a second size of the second DCI format. In certain other aspects, a reduced number of PDCCH candidates or a reduced number of aggregation levels may be used for each of the first DCI format and the second DCI format. For example, referring to FIG. 5, a first DCI format of a first size may be used to indicate a first TM of the combination and a second DCI format of a second size may be used to indicate a second TM of the combination. The number of PDCCH candidates and/or aggregation levels associated with the first DCI format and the second DCI format may be reduced as compared to the number of PDCCH candidates seen in Table 3 above. For example, DCI format 2A may be used to indicate TM 3 and DCI format 2B may be used to indicate TM8, and the base station 502 may transmit the DCI format 2A size using three PDCCH candidates for TM3 and transmit the DCI format 2B size using three PDCCH candidates for TM8. The base station 502 may transmit the reduced number of PDCCH candidates and/or aggregation levels seen above in Tables 4a and/or 4b.

In a fifth aspect, the one or more DCI formats may comprise a first DCI format associated with the first transmission mode and a second DCI format associated with the second transmission mode. In certain other aspects, a first size of the first DCI format may be different than a second size of the second DCI format. In certain other aspects, a first set of PDCCH candidates are transmitted for the first DCI format. In certain other aspects, a second set of PDCCH candidates may be transmitted for the second DCI format. In certain other aspects, the first set of PDCCH candidates and the second set of PDCCH candidates may include a different number of PDCCH candidates or a different number of aggregation levels. For example, referring to FIG. 5, a first DCI format of a first size may be used to indicate a first TM of the combination and a second DCI format of a second size may be used to indicate a second TM of the combination. The base station 502 may transmit a first set of PDCCH candidates (e.g. C1, C2, C3, C4—each with a potentially different set of CCEs) for the first DCI format for the first TM, and a second set of PDCCH candidates (e.g., C1', C2'—each with a potentially different set of CCEs) for the second DCI format for the second TM. The CCEs between C1 and C1' may be different. The base station 502 may transmit the different sets of reduced PDCCH candidates and/or aggregation levels seen above in Tables 5a and/or 5b.

Figure 11:
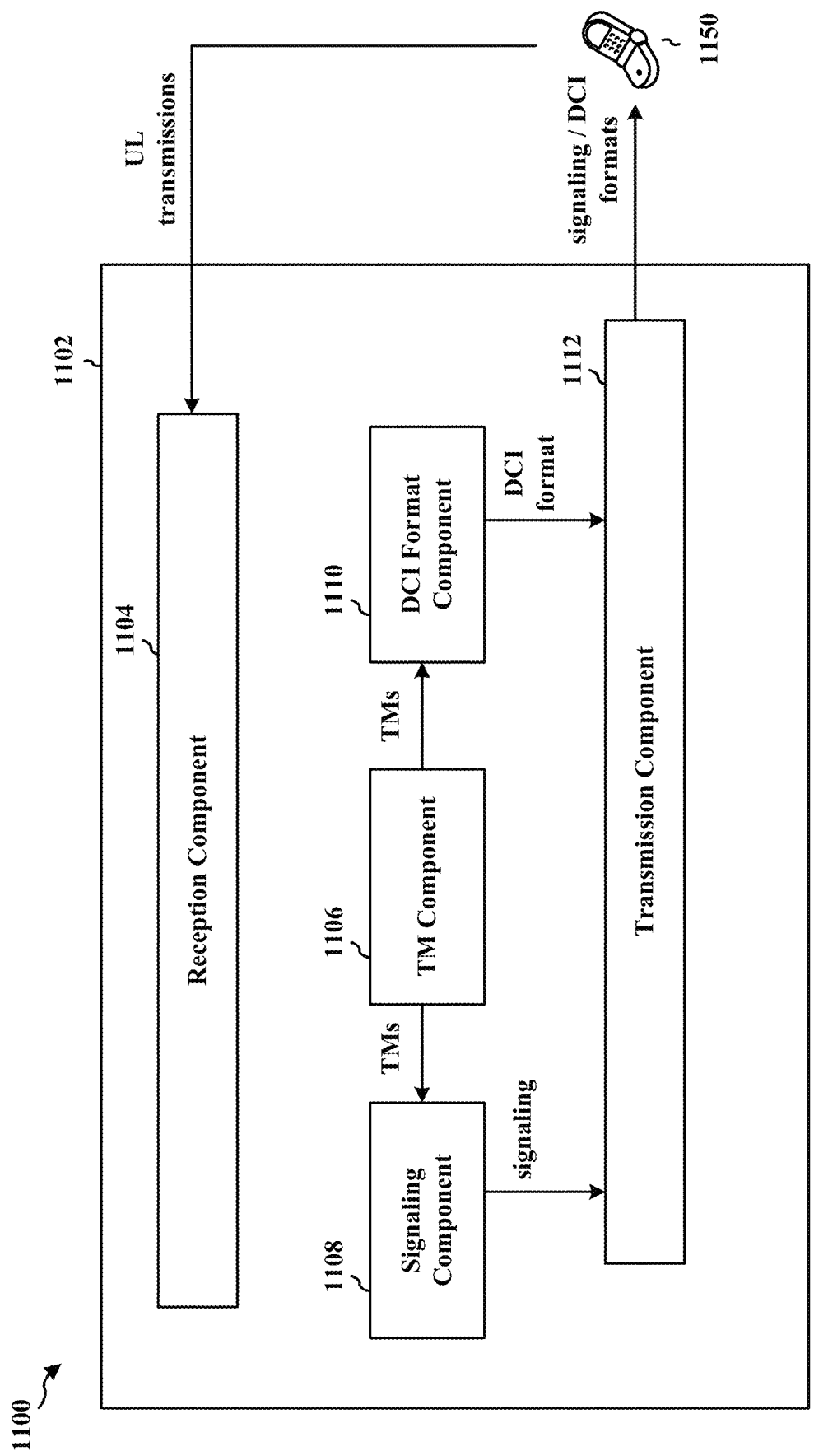
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a base station (e.g., the base station 102, 502, 604, 850, eNB 310, the apparatus 1102') in communication with a UE 1150 (e.g., the UE 104, 350, 504, 602, the apparatus 802/802'). The apparatus may include a reception component 1104, a TM component 1106, a signaling component 1108, a DCI format component 1110, and a transmission component 1112.

The TM component 1106 may be configured to select a combination of TMs for configuring the UE 1150 for downlink transmissions. The TM component 1106 may be configured to send a signal indicating the combination to TMs to one or more of the signaling component 1108 and/or the DCI format component 1110.

The signaling component 1108 may be configured to generate signaling that indicates the combination of TMs, and send the signaling to the transmission component 1112.

The transmission component 1112 may be configured to transmit signaling to the UE 1150 for a combination of transmission modes comprising at least a first transmission mode and a second transmission mode.

The DCI format component 1110 may be configured to generate one or more DCI formats, DCI format sizes, PDCCH candidates, and/or aggregation levels based on the combination of TMs, and send the one or more DCI formats, DCI format sizes, PDCCH candidates, and/or aggregation levels to the transmission component 1112.

The transmission component 1112 may be configured to transmit one or more DCI formats based on the combination of transmission modes, e.g., as described in connection with at least FIGS. 5 and 10.

The reception component 1104 may be configured to receive one or more UL transmissions from the UE 1150.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
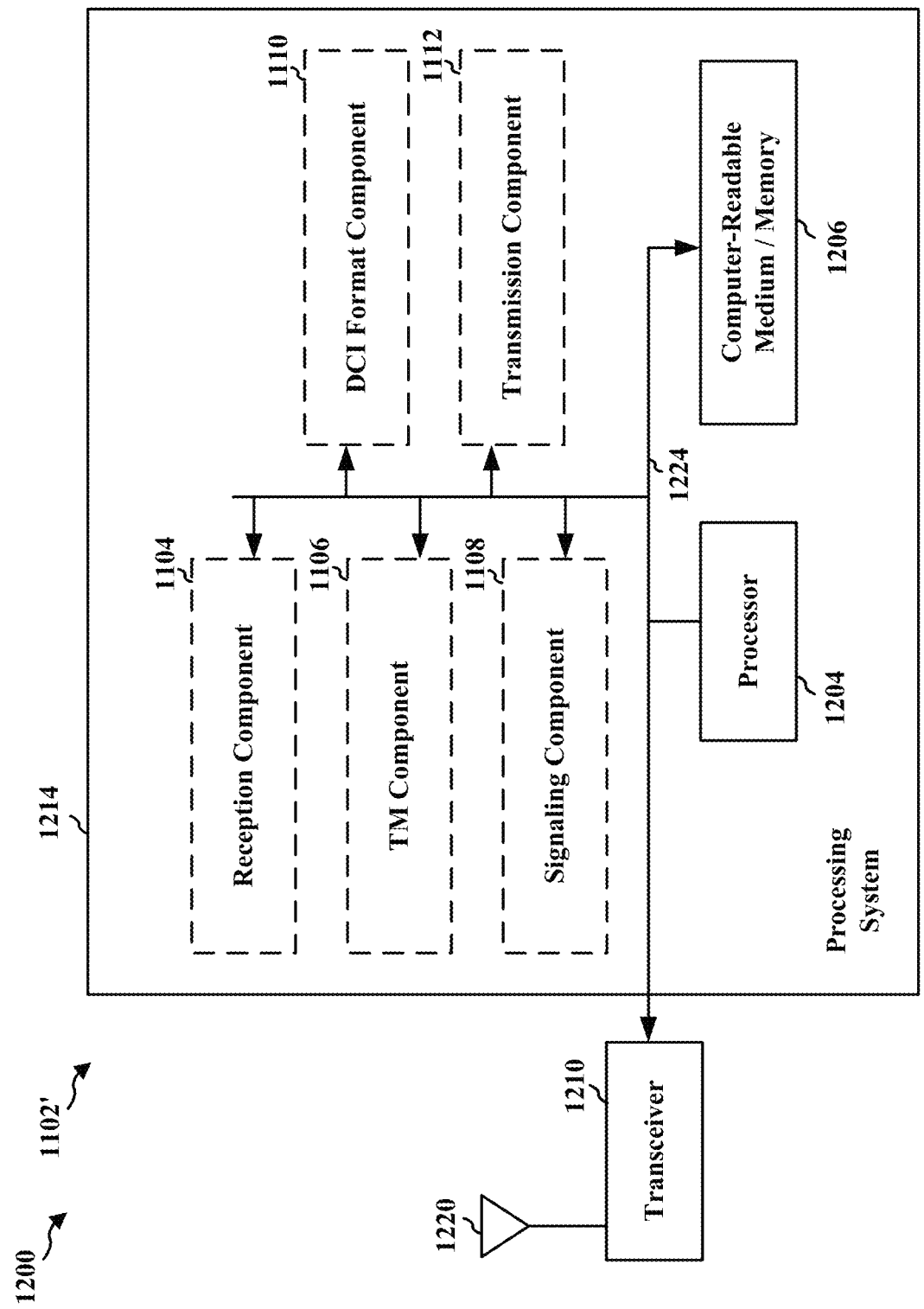
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the eNB 310 and may include the memory 376 and/or at least one of the TX processor 316, the RX processor 370, and the controller/processor 375. Alternatively, the processing system 1214 may be the entire base station (e.g., see base station 310 of FIG. 3).

In certain configurations, the apparatus 1102/1102' for wireless communication may include means for transmitting signaling to the UE 1150 for a combination of transmission modes comprising at least a first transmission mode and a second transmission mode. In certain other configurations, the apparatus 1102/1102' for wireless communication may include means for transmitting one or more DCI formats based on the combination of transmission modes, e.g., as described in connection with at least FIGS. 5 and 10. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
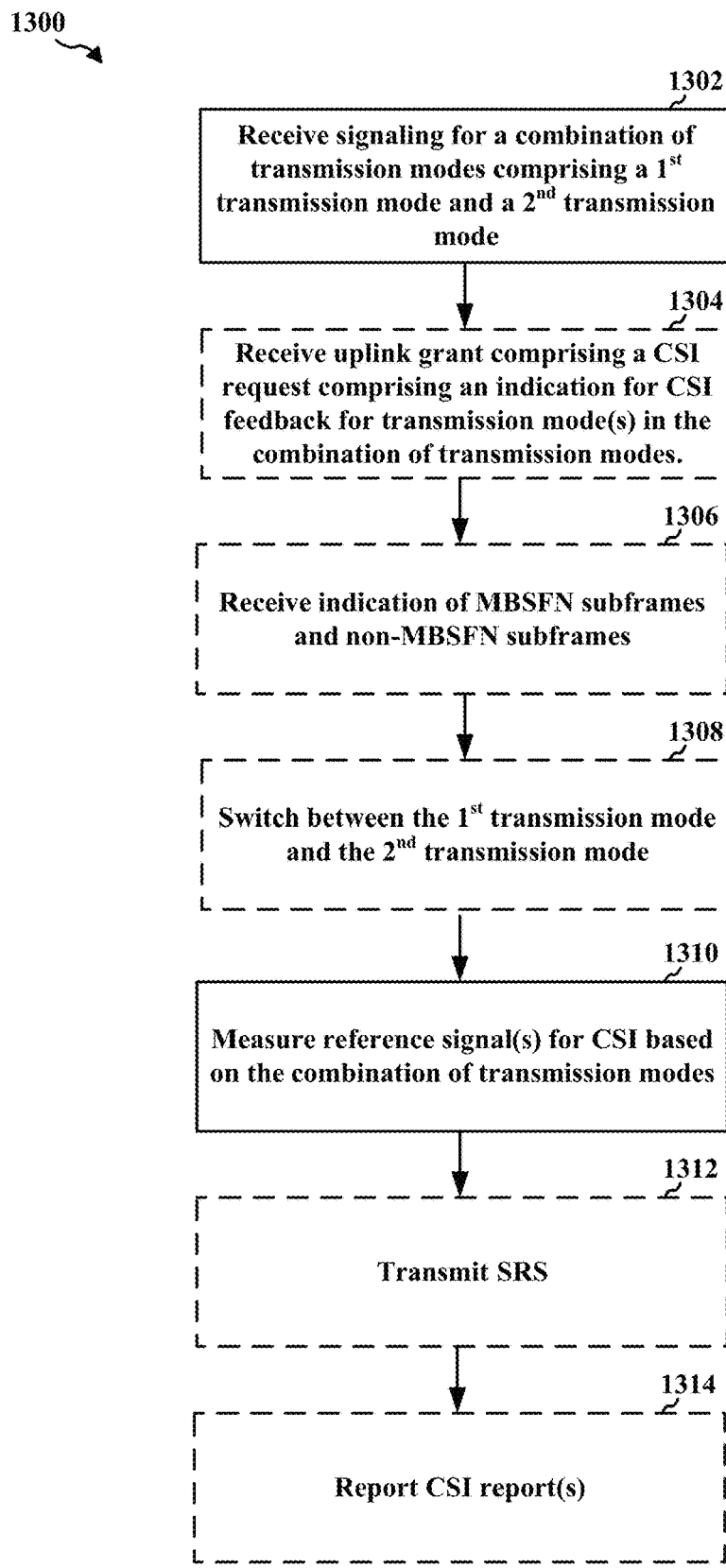
FIG. 13 is a flowchart of a method of wireless communication of a UE.

FIG. 13 is a flowchart 1300 of a method of wireless communication. The method may be performed by a UE (e.g., UE 104, 350, 504, 602, 1750, the apparatus 1402, 1402'; the processing system 1514, which may include the memory 360 and which may be the entire UE 350 or a component of the UE 350, such as the TX processor 368, the RX processor 356, and/or the controller/processor 359). Optional aspects are illustrated with a dashed line. The method improves the ability of a UE to provide CSI feedback for combinations of TMs in a manner that reduces the measurement burden at the UE and the overhead burden for CSI reporting.

At 1302, the UE receives signaling from a base station for a combination of transmission modes comprising at least a first transmission mode and a second transmission mode. For example, the combination may include any of, e.g., TM 3+TM 8, TM 3+TM 9, TM 4+TM 8, TM 4+TM9, TM3+TM4+TM8, TM3+TM4+TM9, etc.) FIG. 6 illustrates an example of TM combination(s) being signaled, at 601, to a UE from a base station.

At 1310, the UE measures at least one reference signal for CSI feedback based on the combination of transmission modes. The UE may measure the reference signal(s), as described in connection with 611 in FIG. 6. For example, a single reference signal, e.g., comprising a CRS, may be measured for a first combination of transmission modes, whereas a first reference signal and a second reference signal, e.g., comprising a CRS and CSI-RS, may be measured for a second combination of transmission modes.

In one example, the UE may measure a unified reference signal, at 1310, for the first transmission mode and the second transmission mode. For example, the unified reference signal may be based on a CRS. The unified reference signal may comprise at least one of a PMI, RI, and/or a CQI selection for at least one transmission mode in the combination of transmission modes. The unified reference signal may be based on a mapping between a CRS and a CSI-RS. The unified reference signal may be based on a CSI-RS. The mapping may relate to such parameters as antenna ports, power offset, beam gain, etc.

At 1314, the UE may report CSI information to the base station for the combination of TMs. FIG. 6 illustrates an example of CSI feedback at 613. At 1310, the UE may measure the reference signal(s) based on a first CSI process for the first transmission mode and a second CSI process for the second transmission mode. Thus, at 1314, the UE may report a first CSI report based on the first CSI process for the first transmission mode and report a second CSI report based on the second CSI process for the second transmission mode. In another example, the UE may report a CSI report, at 1314, based on a single CSI process for both the first transmission mode and the second transmission mode. The different CSI processes could be independently configured, e.g., the first CSI process may be used for TM3, TM4 and/or TM8 and may have no precoding/beamforming on the non-zero-power CSI-RS (NZP-CSI-RS), similar to CRS, whereas the second CSI process may be used for TM9 and may have precoding/beamforming on the NZP-CSI-RS. The precoding/beamforming may be transparent to the UE.

For a first transmission mode, the UE may measure a CRS, e.g., at 1310. For the second transmission mode, the UE may instead transmit an SRS, at 1312. The UE may transmit the SRS for the first transmission mode and/or second transmission mode, at 1312, e.g., when the UE receives the signaling for the combination of transmission modes. The UE may measure a downlink reference signal for the first transmission mode, e.g., at 1310, when the UE receives signaling for the first transmission mode as a single transmission mode. The SRS enables the base station to measures the UL CSI and to use the UL CSI to determine a DL CSI based on the DL/UL reciprocity in a TDD mode. The DL CSI based on the SRS measurement may be used, e.g., for the second transmission mode.

The CSI may be reported, at 1314, by transmission from the UE to the base station over a control channel, such as PUCCH, or a data channel, such as PUSCH.

The UE may report a periodic CSI report, e.g., over PUCCH or PUSCH. In one example, the UE may report a first CSI having a first time offset for the first transmission mode and report a second CSI having a second time offset for the second transmission mode. In addition to the first and second time offset, the first CSI may have a first periodicity for the first transmission mode and the second CSI may have a second periodicity for the second transmission mode. The UE may report the first CSI having the first time offset (and/or periodicity) for MBSFN subframes and may report the second CSI having the second time offset (and/or periodicity) for non-MBSFN subframes. Thus, the CSI feedback may be based on a different time offset with a same or different periodicity or based on a same time offset with a different periodicity.

In another example, the UE may report, at 1314, first CSI information for the first transmission mode and second CSI information for the second transmission mode based on separate CSI reports using a single periodicity and a single time offset.

The same CSI of first CSI information and second CSI information may be reported to the base station in a single CSI report. In this example, the CSI reported by the UE may be based on a PMI and/or RI limitation. For example, the reporting may be based on a single PMI, and/or no PMI. For example, the CSI may be reported within any subband PMI, which may provide limitations on the overhead required to report the CSI. The CSI information for the two transmission modes may be based on the same PMI or separate PMIs for the different transmission modes. Thus, in one example, first CSI information for the first transmission mode may be based on a first PMI, and second CSI information for the second transmission mode may be based on a second PMI. PUCCH may be used to report the CSI, e.g., PUCCH format 4 or 5. In another example, CSI information for both the first transmission mode and the second transmission mode may be based on the same PMI.

The CSI reported at 1314 may comprise an aperiodic CSI report. The aperiodic CSI report may be transmitted from the UE to the base station over a data channel, e.g., PUSCH. In this example, the UE may receive an uplink grant from the base station, at 1304, comprising a CSI request for the aperiodic CSI report. The CSI request may comprise an indication for CSI feedback for at least one transmission mode in the combination of transmission modes. For example, the uplink grant may comprise a 2 bit CSI request, e.g., in DCI format 0. RRC signaling from the base station to the UE may indicate to the UE how to link the 2 bit CSI request to the transmission mode specific CSI feedback. Thus, the RRC signaling may enable the UE to map between the CSI request and the specific CSI feedback that is being requested from the base station for particular transmission mode(s). The mapping relationship between the TM-specific CSI feedback and the two-bit signaling in UL grant may be configured, e.g., by the RRC signaling or may be predefined. For example, '00' may be used for a CSI request in an UL grant to trigger the CSI feedback of the first transmission mode, '01' may be used for a CSI request in an UL grant to trigger the CSI feedback of the second transmission mode, '10' may be used for a CSI request in an UL grant to trigger the CSI feedback of the first transmission mode and the second transmission mode at the same time, and '11' may be used for a CSI request in an UL grant to indicate no CSI feedback for the first transmission mode and the second transmission mode.

The CSI reported at 1314 may comprise a periodic CSI report for the first transmission mode and may also comprise an aperiodic CSI report for the second transmission mode.

The CSI reported at 1314 may comprise a periodic CSI report for the first transmission mode and the second transmission mode. In this example, the CSI reported at 1314 may also comprise an aperiodic CSI report for the first transmission mode and the second transmission mode. The periodic CSI report may comprise first CSI information for a wideband and the aperiodic CSI report may comprise second CSI information for at least one subband within the wideband. Thus, the periodic CSI may comprise a CSI with less information, and the aperiodic CSI may comprise additional CSI details, e.g., subband CSI information.

The UE may perform aperiodic CSI reporting, at 1314, based on an aperiodic CSI-RS for an MBSFN period. In another example, the UE may perform CSI reporting, at 1314, based on a periodic CSI for an MBSFN period. For example, the UE may perform aperiodic CSI-RS measurement and aperiodic CSI reporting for a longer MBSFN period and may perform periodic CSI-RS measurement and periodic CSI reporting for a shorter MBSFN period.

The UE may limit a number of CSI reports sent to the base station, at 1314, for the combination of transmission modes.

As illustrated at 1308, the UE may switch between the first transmission mode and the second transmission mode. For example, the UE may switch between the first transmission mode in an MBSFN period and the second transmission mode in a non-MBSFN period. The UE may receive an indication of MBSFN subframes and non-MBSFN subframes from the base station, at 1306. The switching between the first transmission mode and the second transmission mode, at 1308, may be based on whether a subframe comprises an MBSFN subframe or a non-MBSFN subframe, as indicated to the UE at 1306. Thus, the UE may use the first transmission mode for MBSFN subframes and the second transmission mode for non-MBSFN subframes.

Figure 14:
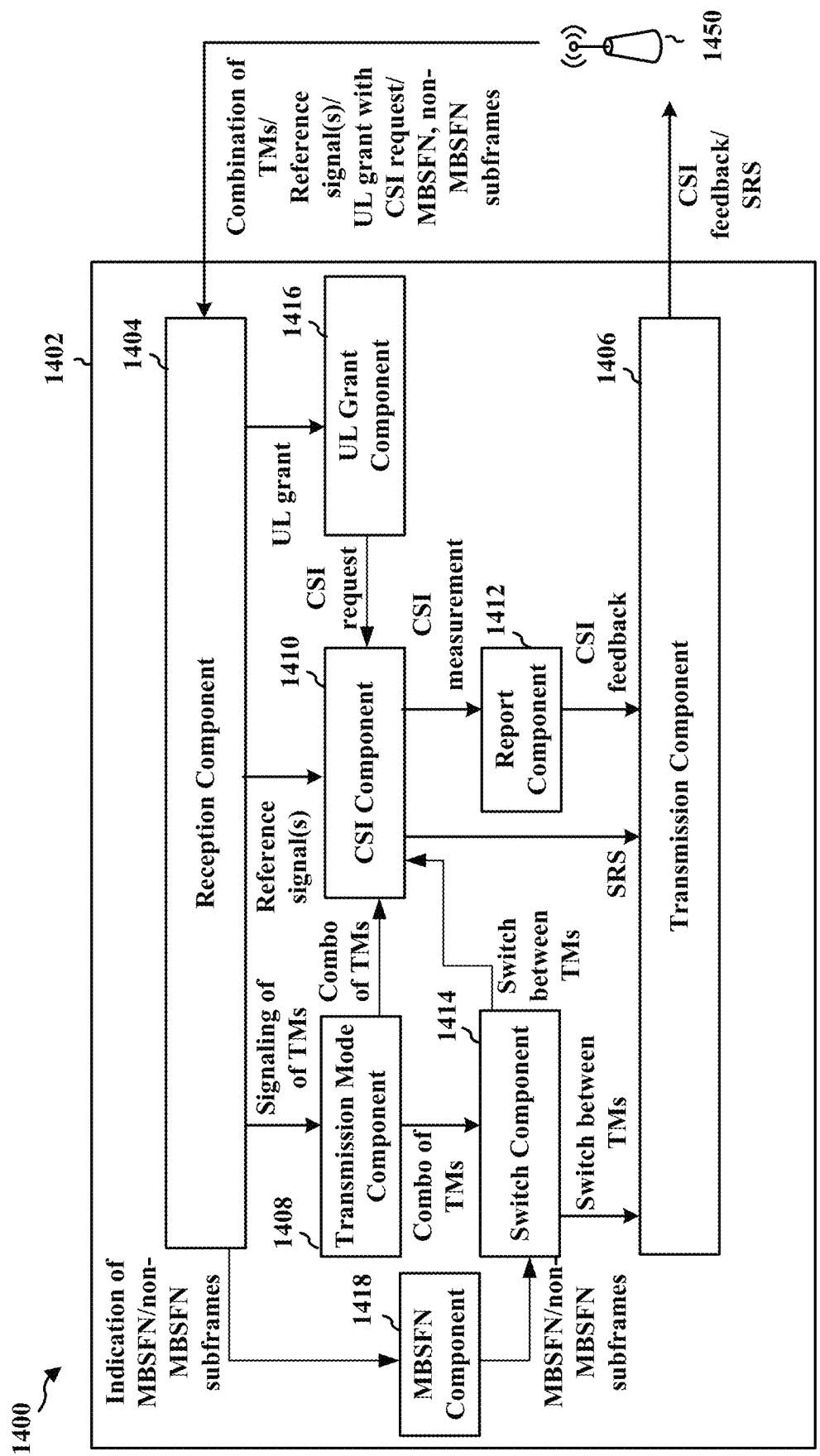
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a UE (e.g., UE 102, 350, 502, 604, 1750) in wireless communication with a base station 1450 (e.g., base station 102, 180, 310, 504, 602, the apparatus 1702, 1702'). The apparatus includes a reception component 1404 that receives downlink communication from the base station and a transmission component 1406 that transmits uplink communication to the base station. The apparatus includes a transmission mode component 1406 configured to receive signaling from a base station for a combination of transmission modes comprising at least a first transmission mode and a second transmission mode. The apparatus may include CSI component 1410 configured to measure at least one reference signal for CSI feedback based on the combination of transmission modes, e.g., as described in connection with 1310 in FIG. 13. The apparatus may comprise report component 1412 configured to report CSI for the combination of transmission modes. In one example, the report component 1412 may be configured to report a first CSI report based on the first CSI process for the first transmission mode and report a second CSI report based on the second CSI process for the second transmission mode. In another example, the report component 1412 may be configured to report a CSI for the two transmission modes based on the same CSI process.

The apparatus may include an uplink grant component 1416 configured to receive an uplink grant from the base station comprising a CSI request for the aperiodic CSI report, wherein the CSI request comprises an indication for CSI feedback for at least one transmission mode in the combination of transmission modes.

The apparatus may comprise switch component 1414 configured to switch between the first transmission mode and the second transmission mode. In one example, the switch component may switch between the first transmission mode in an MBSFN period and the second transmission mode in a non-MBSFN period.

The apparatus may comprise an MBSFN component 1418 configured to receive an indication of MBSFN subframes and non-MBSFN subframes from the base station. In this example, the UE may switch between the first transmission mode and the second transmission mode based on whether a subframe comprises an MBSFN subframe or a non-MBSFN subframe.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
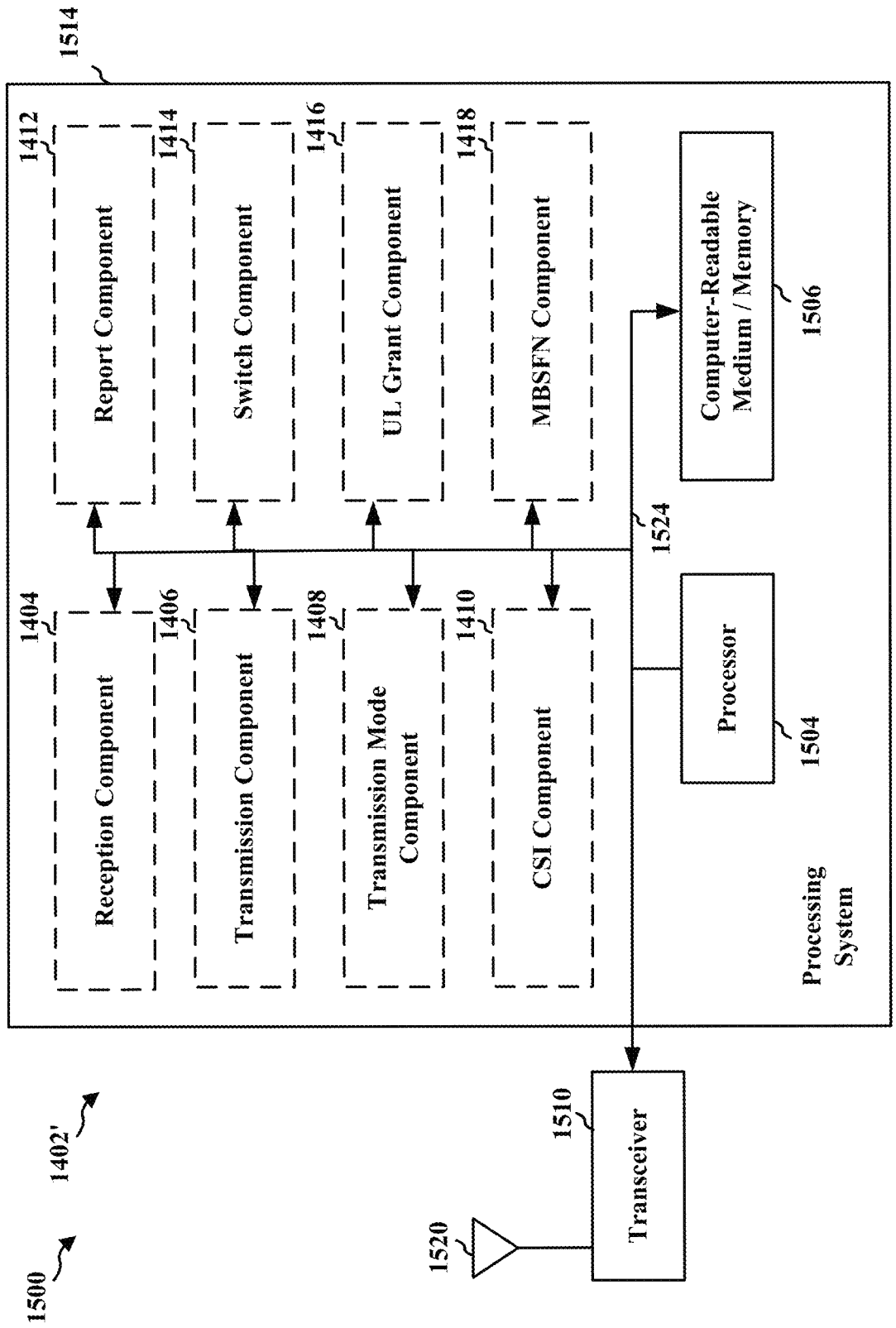
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 1402/1402' for wireless communication includes means for receiving signaling from a base station for a combination of transmission modes comprising at least a first transmission mode and a second transmission mode, means for measuring at least one reference signal for CSI feedback based on the combination of transmission modes, means for reporting a first CSI report based on the first CSI process for the first transmission mode and reporting a second CSI report based on the second CSI process for the second transmission mode, means for reporting CSI for the combination of transmission modes, means for receiving an uplink grant from the base station comprising a CSI request for the aperiodic CSI report, wherein the CSI request comprises an indication for CSI feedback for at least one transmission mode in the combination of transmission modes, means for switching between the first transmission mode in an Multimedia Broadcast multicast service Single Frequency Network (MBSFN) period and the second transmission mode in a non-MBSFN period, and means for receiving an indication of MBSFN subframes and non-MBSFN subframes from the base station. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
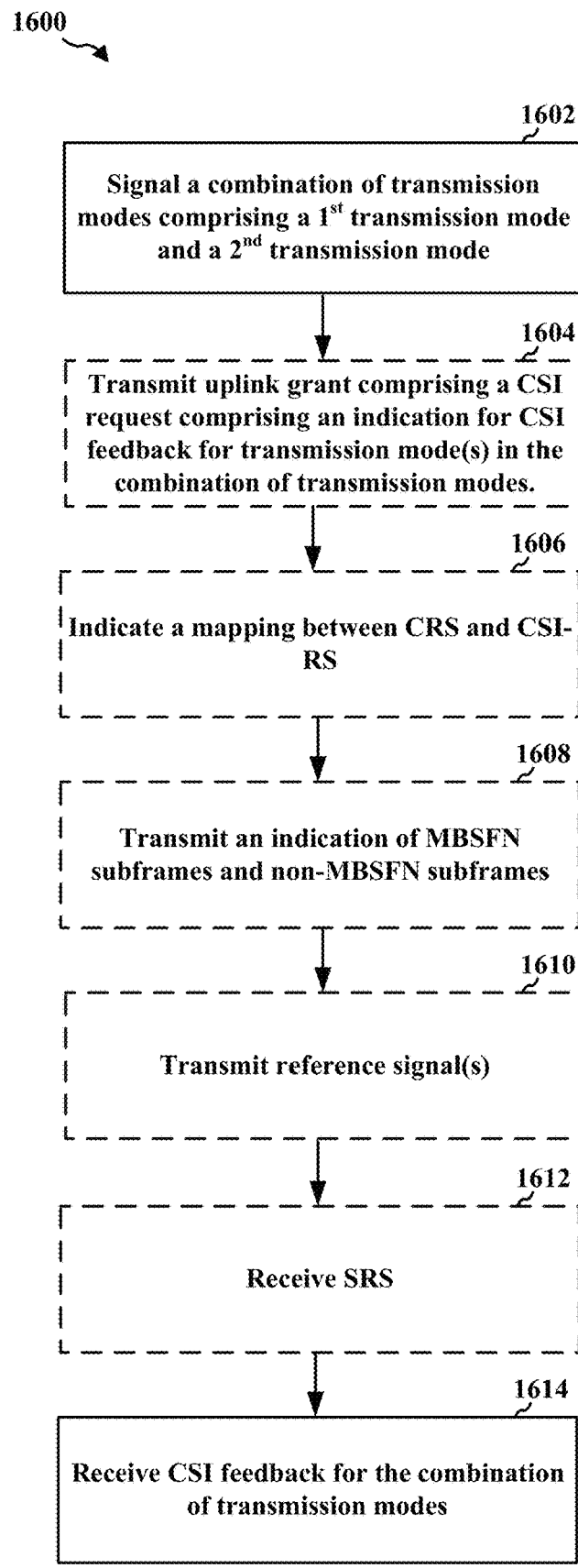
FIG. 16 is a flowchart of a method of wireless communication of a base station.

FIG. 16 is a flowchart 1600 of a method of wireless communication. The method may be performed by a base station (e.g., base station 102, 180, 310, 504, 602, 1450, the apparatus 1702, 1702'; the processing system 1814, which may include the memory 376 and which may be the entire base station 310 or a component of the base station 310, such as the TX processor 316, the RX processor 370 and/or the controller/processor 375). Optional aspects are illustrated with a dashed line. The method improves the ability of a base station to receive CSI feedback for switching combination of transmissions modes.

At 1602, the base station may signal a combination of transmission modes to a UE. The combination of transmission modes comprising at least a first transmission mode and a second transmission mode. For example, the combination may include any of, e.g., TM 3+TM 8, TM 3+TM 9, TM 4+TM 8, TM 4+TM9, TM3+TM4+TM8, TM3+TM4+TM9, etc. FIG. 6 illustrates an example of TM combination(s) being signaled from base station to a UE, at 601.

At 1614, the base station may receive CSI feedback for the combination of transmission modes based on at least one reference signal. The CSI feedback may comprise periodic CSI reports and/or aperiodic CSI reports. The CSI feedback may be received on a control channel, such as PUCCH, or a data channel, such as PUSCH. FIG. 6 illustrates an example of CSI feedback at 613 that is received by base station 604 from UE 602.

The CSI feedback may be based on a single reference signal, e.g., CRS, for a first combination of transmission modes and a first reference signal and a second reference signal, e.g., CRS and CSI-RS, for a second combination of transmission modes.

In another example, the CSI feedback may be based on a unified reference signal for the first transmission mode and the second transmission mode. The unified reference signal may be based on a CRS. The unified reference signal may comprise at least one of a PMI, RI, or CQI selection for at least one transmission mode in the combination of transmission modes. As illustrated at 1606, the base station may indicate a mapping between a CRS and a CSI-RS to the UE, e.g., such as antenna ports, power offset, beam gain, etc. The unified reference signal may be based on a CSI-RS and at least one of a PMI, RI, or CQI for at least one transmission mode in the combination of transmission modes.

The CSI feedback received at 1614 may be based on a first CSI process for the first transmission mode and a second CSI process for the second transmission mode. The base station may receive a first CSI report based on the first CSI process for the first transmission mode and receive a second CSI report based on the second CSI process for the second transmission mode. In another example, the base station may receive a CSI report based on a single CSI process for both the first transmission mode and the second transmission mode.

The CSI feedback may be based on a CRS for the first transmission mode and a SRS for the second transmission mode. Thus, at 1612, the base station may receive SRS. In another example, the CSI feedback may be based on an SRS for the first transmission mode, when the base station signals the combination of transmission modes, whereas the CSI feedback is based on a downlink reference signal for the first transmission mode when the base station signals the first transmission mode as a single transmission mode. The base station may receive the SRS from the UE and measure the UL CSI for the SRS. The base station may use the measured UL CSI to determine a DL CSI based on the DL/UL reciprocity in TDD mode.

At 1614, the base station may receive a first CSI having a first time offset for the first transmission mode and receive a second CSI having a second time offset for the second transmission mode. The base station may receive the first CSI having the first time offset for MBSFN subframes and receive the second CSI having the second time offset for non-MBSFN subframes.

The base station may receive first CSI information for the first transmission mode and second CSI information for the second transmission mode based on separate CSI reports using a single periodicity and a single time offset. The same CSI of the first CSI information and the second CSI information may be received from the UE in a single CSI report. In this example, the CSI reported by the UE may be based on a Precoding Matrix Indicator limitation. For example, the reporting may be based on a single PMI, and/or no PMI. For example, the CSI may be reported within any subband PMI, which may provide limitations on the overhead required to report the CSI. The CSI information for the two transmission modes may be based on the same PMI or separate PMIs for the different transmission modes. Thus, in one example, first CSI information for the first transmission mode may be based on a first PMI, and second CSI information for the second transmission mode may be based on a second PMI. PUCCH may be used to report the CSI, e.g., PUCCH format 4 or 5. In another example, CSI information for both the first transmission mode and the second transmission mode may be based on the same PMI.

In another example, the CSI may comprise an aperiodic CSI report. The aperiodic report may be received on a data channel, e.g., PUSCH. The base station may transmit, at 1604, an uplink grant from the base station comprising a CSI request for the aperiodic CSI report, wherein the CSI request comprises an indication for CSI feedback for at least one transmission mode in the combination of transmission modes. For example, the uplink grant may comprise a 2 bit CSI request, e.g., in DCI format 0. RRC signaling from the base station to the UE may indicate to the UE how to link the 2 bit CSI request to the transmission mode specific CSI feedback. Thus, the RRC signaling may enable the UE to map between the CSI request and the specific CSI feedback that is being requested from the base station for particular transmission mode(s). The mapping relationship between the TM-specific CSI feedback and the two-bit signaling in UL grant may be configured, e.g., by the RRC signaling or may be predefined. For example, '00' may be used for a CSI request in an UL grant to trigger the CSI feedback of the first transmission mode, '01' may be used for a CSI request in an UL grant to trigger the CSI feedback of the second transmission mode, '10' may be used for a CSI request in an UL grant to trigger the CSI feedback of the first transmission mode and the second transmission mode at the same time, and '11' may be used for a CSI request in an UL grant to indicate no CSI feedback for the first transmission mode and the second transmission mode.

In another example, the CSI may comprise a periodic CSI report for the first transmission mode and an aperiodic CSI report for the second transmission mode. In yet another example, the CSI may comprise a periodic CSI report for the first transmission mode and the second transmission mode and an aperiodic CSI report for the first transmission mode and the second transmission mode. The periodic CSI report may comprise first CSI information for a wideband, and the aperiodic CSI report may comprise second CSI information for at least one subband within the wideband.

The base station may receive aperiodic CSI reporting based on an aperiodic CSI-RS for an MBSFN period, e.g., for a longer MBSFN period. The base station may receive CSI reporting based on a periodic CSI for an MBSFN period, e.g., for a shorter MBSFN period.

The UE may dynamically switch between the first transmission mode and the second transmission mode. The UE may switch between the first transmission mode and the second transmission mode based on whether a subframe comprises an MBSFN subframe or a non-MBSFN subframe. Thus, the first transmission mode may be used for MBSFN subframes and the second transmission mode is used for non-MBSFN subframes. In this example, the base station may transmit an indication of MBSFN subframes and non-MBSFN subframes to the UE, e.g., at 1608.

At 1610, the base station may transmit reference signal(s), e.g., on which the CSI feedback may be based. For example, the base station may transmit a CRS. The base station may transmit a DM-RS. The CRS transmission might always be transmitted, e.g., for TM3 or TM4, whereas the DM-RS might only be transmitted when TM8 or TM9 are dynamically turned on. Thus, DM-RS might only be transmitted at 1610 when the combination of transmission modes comprises a DM-RS based transmission mode.

Figure 17:
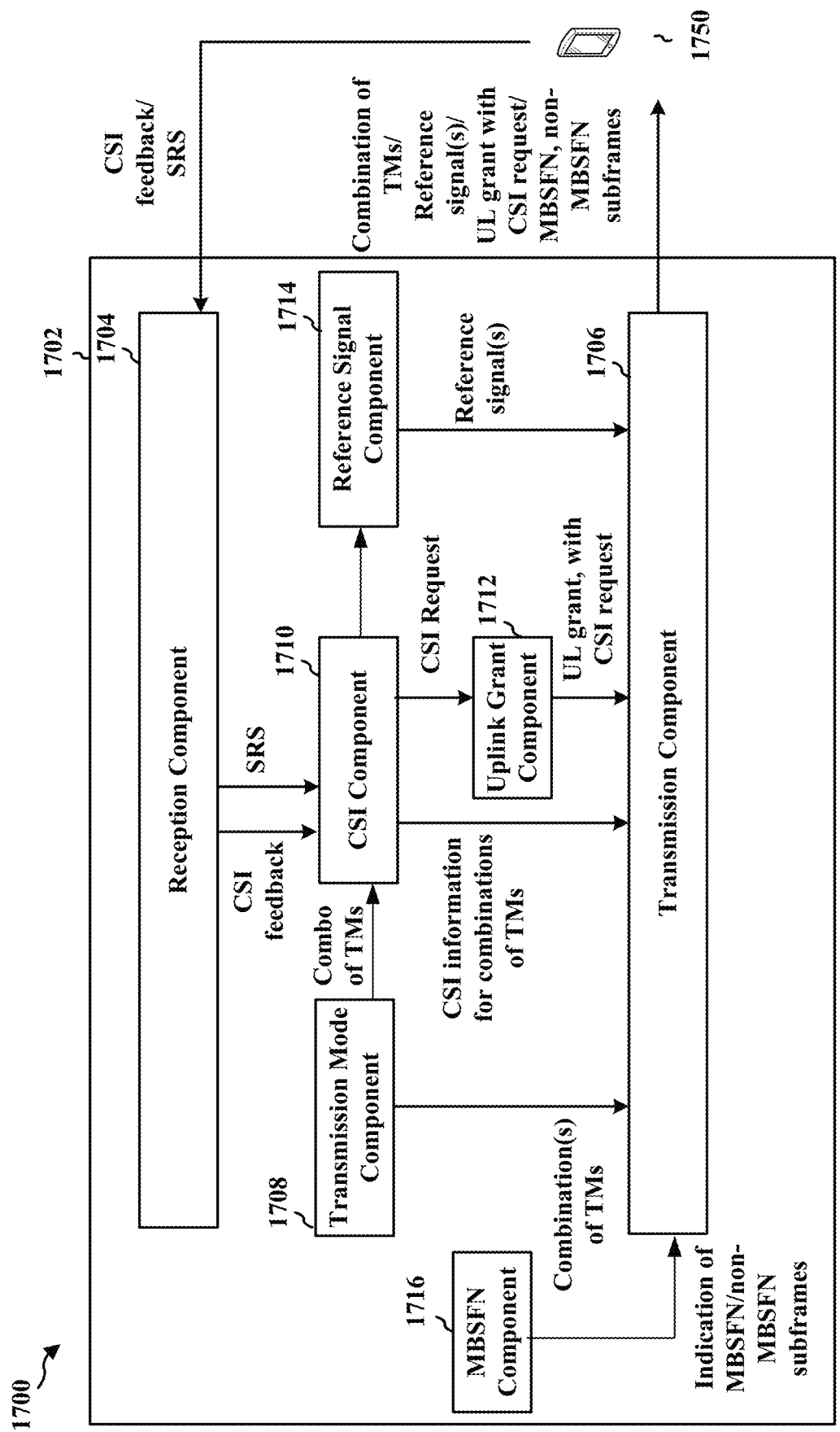
FIG. 17 is a conceptual data flow diagram illustrating the data flow between different means/components in an example apparatus.

FIG. 17 is a conceptual data flow diagram 1700 illustrating the data flow between different means/components in an example apparatus 1702. The apparatus may be a base station (e.g., base station 102, 180, 310, 504, 602, 1450, the apparatus 1702, 1702') in wireless communication with UE 1750 (e.g., UE 104, 350, 502, 604, the apparatus 1402, 1402'). The apparatus includes a reception component 1704 that receives uplink communication from UE 1750 and a transmission component 1706 that transmits downlink communication to UE 1750. The apparatus may include transmission mode component 1708 configured to signal a combination of transmission modes comprising at least a first transmission mode and a second transmission mode to UE 1750.

The apparatus may include CSI component 1710 configured to receive CSI feedback for the combination of transmission modes based on at least one reference signal, e.g., as described in connection with 1614 in FIG. 16. CSI component 1710 may also provide information to the UE to enable the UE to provide CSI feedback for the combination(s) of transmission modes. For example, the base station may indicate to the UE a mapping between a CRS and a CSI-RS to the UE.

The apparatus may include an uplink grant component 1712 configured to transmit an uplink grant from the base station comprising a CSI request for the aperiodic CSI report, wherein the CSI request comprises an indication for CSI feedback for at least one transmission mode in the combination of transmission modes.

The apparatus may comprise an MBSFN component 1716 configured to transmit an indication of MBSFN subframes and non-MBSFN subframes from the base station. In this example, the UE may switch between the first transmission mode and the second transmission mode based on whether a subframe comprises an MBSFN subframe or a non-MBSFN subframe.

The apparatus may comprise a reference signal component 1714 configured to transmit at least one reference signal, e.g., any of CRS, CSI-RS, DM-RS. For example, the reference signal component may be configured to transmit CRS and to transmit DM-RS only when the combination of transmission modes comprises a DM-RS based transmission mode.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
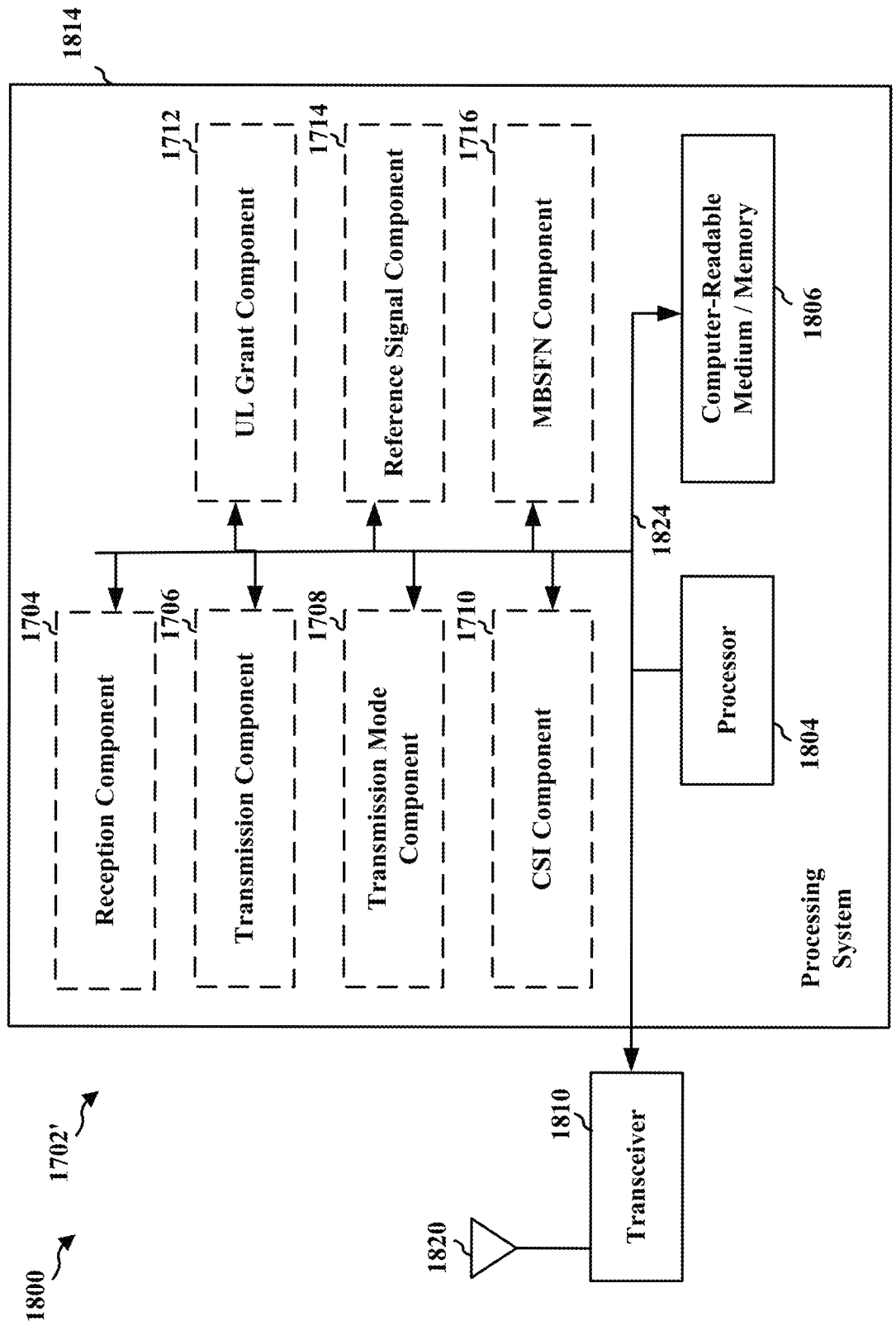
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, 1714, 1716, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806.

The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712, 1714, 1716. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375. Alternatively, the processing system 1214 may be the entire base station (e.g., see base station 310 of FIG. 3).

In one configuration, the apparatus 1702/1702' for wireless communication includes means for signaling a combination of transmission modes to a UE, the combination of transmission modes comprising at least a first transmission mode and a second transmission mode, means for receiving CSI feedback for the combination of transmission modes based on at least one reference signal, means for indicating a mapping between a CRS and a CSI-RS to the UE, means for receiving a first CSI report based on the first CSI process for the first transmission mode and receiving a second CSI report based on the second CSI process for the second transmission mode, means for receiving a CSI report based on a single CSI process for both the first transmission mode and the second transmission mode, means for transmitting an uplink grant from the base station comprising a CSI request for the aperiodic CSI report, wherein the CSI request comprises an indication for CSI feedback for at least one transmission mode in the combination of transmission modes, means for transmitting an indication of MBSFN subframes and non-MBSFN subframes from the base station, means for transmitting a CRS, means for transmitting a DM-RS only when the combination of transmission modes comprises a DM-RS based transmission mode, and means for receiving SRS. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    receiving signaling from a base station for a combination of transmission modes comprising at least a first transmission mode and a second transmission mode;
    monitoring one or more downlink control information (DCI) formats based on the combination of transmission modes; and
    determining to utilize the first transmission mode or the second transmission mode based on a radio network temporary identifier (RNTI) of the one or more DCI formats, a flag bit of the one or more DCI formats, a quasi colocation information (QCI) bit of the one or more DCI formats, or a size of the one or more DCI formats.

2. The method of claim 1, wherein the one or more DCI formats comprises a first DCI format associated with the first transmission mode and a second DCI format associated with the second transmission mode.

3. The method of claim 2, wherein the first DCI format and the second DCI format are monitored based on a same size DCI format for the first DCI format and the second DCI format, wherein a first size of the first DCI format is equal to a second size of the second DCI format with additional padding bits.

4. The method of claim 2, wherein the first DCI format and the second DCI format are monitored based on a same size DCI format for the first DCI format and the second DCI format, wherein a first size of the first DCI format is equal to a second size of the second DCI format with no additional padding bits.

5. The method of claim 2, wherein:
    the first DCI format is detected using a first RNTI and the second DCI format is detected using a second RNTI, and
    the first RNTI is different than the second RNTI.

6. The method of claim 1, wherein:
the one or more DCI formats comprises a first DCI format associated with the first transmission mode and a second DCI format associated with the second transmission mode, and the first DCI format and the second DCI format each include at least one flag bit indicating one of the first transmission mode and the second transmission mode.

7. The method of claim 1, wherein:
the one or more DCI formats comprises a first DCI format associated with the first transmission mode and a second DCI format associated with the second transmission mode;
wherein the first DCI format includes a first set of QCI bits indicating the first transmission mode;
wherein the second DCI format includes a second set of QCI bits indicating the second transmission mode; and
the first set of QCI bits being different than the second set of QCI bits.

8. The method of claim 1, wherein:
the one or more DCI formats comprises a first DCI format associated with the first transmission mode and a second DCI format associated with the second transmission mode,
a first size of the first DCI format is different than a second size of the second DCI format, and
a reduced number of physical downlink control channel (PDCCH) candidates or a reduced number of aggregation levels are monitored for each of the first DCI format and the second DCI format.

9. A method of wireless communication of a user equipment (UE), comprising:
receiving signaling from a base station for a combination of transmission modes comprising at least a first transmission mode and a second transmission mode;
monitoring one or more downlink control information (DCI) formats based on the combination of transmission modes, wherein
the one or more DCI formats comprises a first DCI format associated with the first transmission mode and a second DCI format associated with the second transmission mode,
a first size of the first DCI format is different than a second size of the second DCI format,
a first set of physical downlink control channel (PDCCH) candidates are monitored for the first DCI format,
a second set of PDCCH candidates are monitored for the second DCI format, and
the first set of PDCCH candidates and the second set of PDCCH candidates include a different number of PDCCH candidates or a different number of aggregation levels.

10. A method of wireless communication of a base station, comprising:
transmitting signaling to a user equipment (UE) for a combination of transmission modes comprising at least a first transmission mode and a second transmission mode;
determining to utilize the first transmission mode or the second transmission mode; and
transmitting one or more downlink control information (DCI) formats based on the combination of transmission modes, wherein a radio network temporary identifier (RNTI) of the one or more DCI formats, a flag bit of the one or more DCI formats, a quasi colocation information (QCI) bit of the one or more DCI formats, or a size of the one or more DCI formats is based on whether the base station determined to utilize the first transmission mode or the second transmission mode.

11. The method of claim 10, wherein the one or more DCI formats comprises a first DCI format associated with the first transmission mode and a second DCI format associated with the second transmission mode.

12. The method of claim 11, wherein the first DCI format and the second DCI format are transmitted with a same size for the first DCI format and the second DCI format, wherein a first size of the first DCI format is equal to a second size of the second DCI format with additional padding bits.

13. The method of claim 11, wherein the first DCI format and the second DCI format are transmitted with a same size for the first DCI format and the second DCI format, wherein a first size of the first DCI format is equal to a second size of the second DCI format with no additional padding bits.

14. The method of claim 11, wherein:
the first DCI format is transmitted using a first RTNI and the second DCI format is transmitted using a second RNTI, and
the first RNTI is different than the second RNTI.

15. The method of claim 10, wherein:
the one or more DCI formats comprises a first DCI format associated with the first transmission mode and a second DCI format associated with the second transmission mode, and
the first DCI format and the second DCI format each include at least one flag bit indicating one of the first transmission mode and the second transmission mode.

16. The method of claim 10, wherein:
the one or more DCI formats comprises a first DCI format with the first transmission mode and a second DCI format associated with the second transmission mode,
wherein the first DCI format includes a first set of QCI bits indicating the first transmission mode;
wherein the second DCI format includes a second set of QCI bits indicating the second transmission mode; and
the first set of QCI bits is different than the second set of QCI bits.

17. The method of claim 10, wherein:
the one or more DCI formats comprises a first DCI format associated with the first transmission mode and a second DCI format associated with the second transmission mode,
a first size of the first DCI format is different than a second size of the second DCI format, and
a reduced number of physical downlink control channel (PDCCH) candidates or a reduced number of aggregation levels are used for each of the first DCI format and the second DCI format.

18. A method of wireless communication of a base station, comprising:
transmitting signaling to a user equipment (UE) for a combination of transmission modes comprising at least a first transmission mode and a second transmission mode; and
transmitting one or more downlink control information (DCI) formats based on the combination of transmission modes, wherein
the one or more DCI formats comprises a first DCI format associated with the first transmission mode and a second DCI format associated with the second transmission mode,
a first size of the first DCI format is different than a second size of the second DCI format, a first set of physical downlink control channel (PDCCH) candidates are used for the first DCI format, a second set of PDCCH candidates are used for the second DCI format, and the first set of PDCCH candidates and the second set of PDCCH candidates include a different number of PDCCH candidates or a different number of aggregation levels.

19. An apparatus for wireless communication of a user equipment (UE), comprising:

a memory; and at least one processor coupled to the memory and configured to:

receive signaling from a base station for a combination of transmission modes comprising at least a first transmission mode and a second transmission mode; and monitor one or more downlink control information (DCI) formats based on the combination of transmission modes; and determine to utilize the first transmission mode or the second transmission mode based on a radio network temporary identifier (RNTI) of the one or more DCI formats, a flag bit of the one or more DCI formats, a quasi colocation information (QCI) bit of the one or more DCI formats, or a size of the one or more DCI formats.

20. The apparatus of claim 19, wherein the one or more DCI formats comprises a first DCI format associated with the first transmission mode and a second DCI format associated with the second transmission mode.

21. The apparatus of claim 20, wherein:

the first DCI format is detected using a first RNTI and the second DCI format is detected using a second RNTI, and the first RNTI is different than the second RNTI.

22. The apparatus of claim 19, wherein:

the one or more DCI formats comprises a first DCI format associated with the first transmission mode and a second DCI format associated with the second transmission mode, wherein the first DCI format includes a first set of QCI bits indicating the first transmission mode;

wherein the second DCI format includes a second set of QCI bits indicating the second transmission mode; and the first set of QCI bits is different than the second set of QCI bits.

23. The apparatus of claim 19, wherein:

the one or more DCI formats comprises a first DCI format associated with the first transmission mode and a second DCI format associated with the second transmission mode, a first size of the first DCI format is different than a second size of the second DCI format, and a reduced number of physical downlink control channel (PDCCH) candidates or a reduced number of aggregation levels are monitored for each of the first DCI format and the second DCI format.

24. An apparatus for wireless communication of a user equipment (UE), comprising:

a memory; and at least one processor coupled to the memory and configured to:

receive signaling from a base station for a combination of transmission modes comprising at least a first transmission mode and a second transmission mode; and monitor one or more downlink control information (DCI) formats based on the combination of transmission modes, wherein the one or more DCI formats comprises a first DCI format associated with the first transmission mode and a second DCI format associated with the second transmission mode, a first size of the first DCI format is different than a second size of the second DCI format, a first set of physical downlink control channel (PDCCH) candidates are monitored for the first DCI format, a second set of PDCCH candidates are monitored for the second DCI format, and the first set of PDCCH candidates and the second set of PDCCH candidates include a different number of PDCCH candidates or a different number of aggregation levels.

25. An apparatus for wireless communication of a base station, comprising:

a memory; and at least one processor coupled to the memory and configured to:

transmit signaling to a user equipment (UE) for a combination of transmission modes comprising at least a first transmission mode and a second transmission mode;

determine to utilize the first transmission mode or the second transmission mode; and transmit one or more downlink control information (DCI) formats based on the combination of transmission modes, wherein a radio network temporary identifier (RNTI) of the one or more DCI formats, a flag bit of the one or more DCI formats, a quasi colocation information (QCI) bit of the one or more DCI formats, or a size of the one or more DCI formats is based on whether the base station determined to utilize the first transmission mode or the second transmission mode.

26. The apparatus of claim 25, wherein the one or more DCI formats comprises a first DCI format associated with the first transmission mode and a second DCI format associated with the second transmission mode.

27. The apparatus of claim 26, wherein:

the first DCI format is transmitted using a first RNTI and the second DCI format is transmitted using a second RNTI, and the first RNTI is different than the second RNTI.

28. The apparatus of claim 25, wherein:

the one or more DCI formats comprises a first DCI format associated with the first transmission mode and a second DCI format associated with the second transmission mode, wherein the first DCI format includes a first set of QCI bits indicating the first transmission mode;

wherein the second DCI format includes a second set of QCI bits indicating the second transmission mode; and the first set of QCI bits is different than the second set of QCI bits.

29. The apparatus of claim 25, wherein:

the one or more DCI formats comprises a first DCI format associated with the first transmission mode and a second DCI format associated with the second transmission mode, a first size of the first DCI format is different than a second size of the second DCI format, and a reduced number of physical downlink control channel (PDCCH) candidates or a reduced number of aggregation levels are used for each of the first DCI format and the second DCI format.

30. An apparatus for wireless communication of a base station, comprising:
- a memory; and
- at least one processor coupled to the memory and configured to:
  - transmit signaling to a user equipment (UE) for a combination of transmission modes comprising at least a first transmission mode and a second transmission mode; and
  - transmit one or more downlink control information (DCI) formats based on the combination of transmission modes, wherein
  - the one or more DCI formats comprises a first DCI format associated with the first transmission mode and a second DCI format associated with the second transmission mode,
  - a first size of the first DCI format is different than a second size of the second DCI format,
  - a first set of physical downlink control channel (PDCCH) candidates are used for the first DCI format,
  - a second set of PDCCH candidates are used for the second DCI format, and
  - the first set of PDCCH candidates and the second set of PDCCH candidates include a different number of PDCCH candidates or a different number of aggregation levels.

* * * * *